(12) United States Patent
Shirotori et al.

(10) Patent No.: US 12,424,242 B2
(45) Date of Patent: Sep. 23, 2025

(54) MAGNETIC HEAD AND MAGNETIC RECORDING DEVICE

(71) Applicant: KABUSHIKI KAISHA TOSHIBA, Tokyo (JP)

(72) Inventors: Satoshi Shirotori, Yokohama Kanagawa (JP); Tazumi Nagasawa, Yokohama Kanagawa (JP); Yoshihiro Higashi, Komatsu Ishikawa (JP); Akira Kikitsu, Yokohama Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 18/410,791

(22) Filed: Jan. 11, 2024

(65) Prior Publication Data

US 2024/0371400 A1   Nov. 7, 2024

(30) Foreign Application Priority Data

May 2, 2023 (JP) .................... 2023-075950

(51) Int. Cl.
 *G11B 5/11* (2006.01)
(52) U.S. Cl.
 CPC ..................... *G11B 5/11* (2013.01)
(58) Field of Classification Search
 None
 See application file for complete search history.

(56) References Cited

U.S. PATENT DOCUMENTS

| | | | |
|---|---|---|---|
| 7,576,948 B2 | 8/2009 | Covington et al. | |
| 9,293,160 B1 | 3/2016 | Mihajlovic et al. | |
| 9,837,106 B1 | 12/2017 | Contreras et al. | |
| 11,094,338 B1* | 8/2021 | Hwang | G11B 5/315 |
| 11,100,946 B1* | 8/2021 | Le | G11B 5/3932 |
| 11,170,808 B1 | 11/2021 | Liu et al. | |
| 11,222,656 B1* | 1/2022 | Le | G11B 5/372 |
| 2015/0062755 A1* | 3/2015 | Sapozhnikov | G11B 5/3951 |
| | | | 360/315 |
| 2022/0399033 A1* | 12/2022 | Nakagawa | G11B 5/1278 |
| 2023/0326482 A1* | 10/2023 | Nakagawa | G11B 5/1278 |
| | | | 428/812 |

(Continued)

FOREIGN PATENT DOCUMENTS

| | | | |
|---|---|---|---|
| JP | 2018-206462 A | | 12/2018 |
| WO | WO-2025013369 A1 | * | 1/2025 |

*Primary Examiner* — William J Klimowicz
(74) *Attorney, Agent, or Firm* — Finnegan, Henderson, Farabow, Garrett & Dunner, LLP

(57) ABSTRACT

According to one embodiment, a magnetic head includes a first element, a second element, a first shield terminal, a first opposing shield terminal, a second shield terminal, a second opposing shield terminal, a first side shield terminal, a second side shield terminal, and a common side shield terminal. The first element includes a first shield, a first opposing shield, a first side shield, a first opposing side shield, and a first magnetic member. A direction from the first shield to the first opposing shield is along a first direction. The second element includes a second shield, a second opposing shield, a second side shield, a second opposing side shield, and a second magnetic member. A direction from the second shield to the second opposing shield or a direction from the second opposing shield to the second shield is along the first direction.

6 Claims, 16 Drawing Sheets

(56) References Cited

U.S. PATENT DOCUMENTS

| | | | |
|---|---|---|---|
| 2024/0032437 A1* | 1/2024 | Le | G11B 5/3909 |
| 2024/0135961 A1* | 4/2024 | Nagasawa | G11B 5/1272 |
| 2024/0257829 A1* | 8/2024 | Shirotori | G11B 5/11 |
| 2024/0340022 A1* | 10/2024 | Hashisaka | H03M 1/78 |
| 2025/0037737 A1* | 1/2025 | Shirotori | G11B 5/315 |

* cited by examiner

MAGNETIC HEAD AND MAGNETIC RECORDING DEVICE

CROSS-REFERENCE TO RELATED APPLICATIONS

This application is based upon and claims the benefit of priority from Japanese Patent Application No. 2023-075950, filed on May 2, 2023; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head that includes a magnetic sensor. It is desired to improve the performance of magnetic heads.

DETAILED DESCRIPTION

Figure 1:
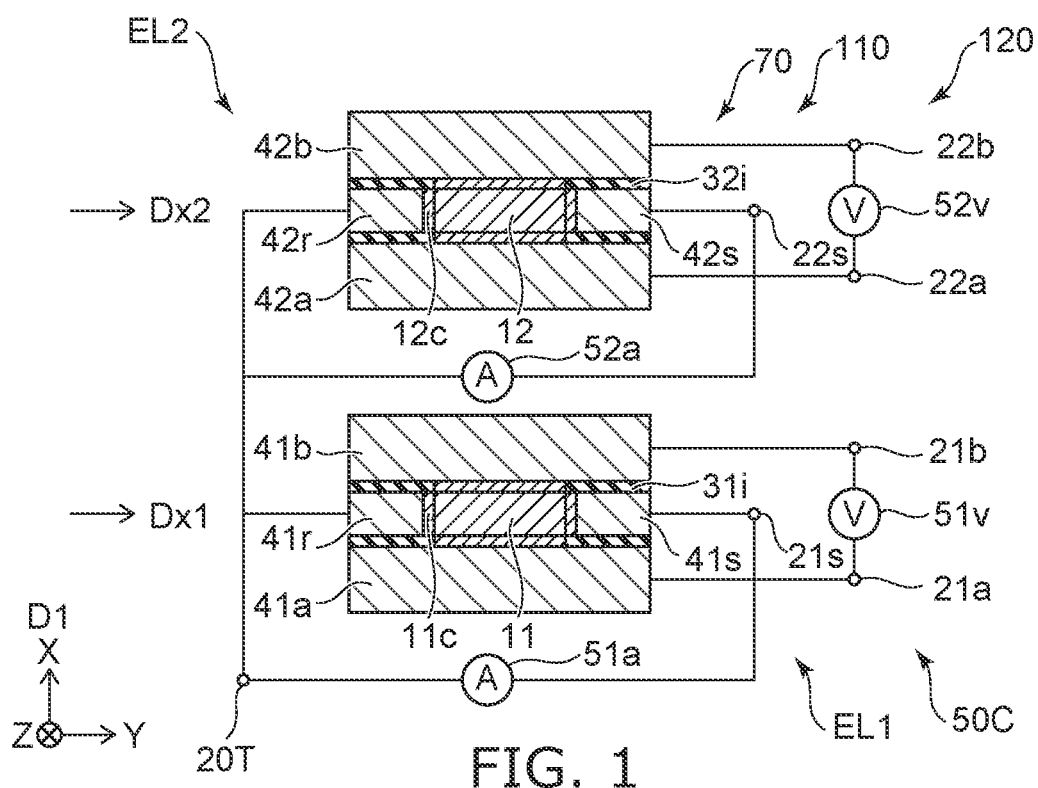
FIG. 1 is a schematic cross-sectional view illustrating a magnetic head according to a first embodiment.

According to one embodiment, a magnetic head includes a first element, a second element, a first shield terminal, a first opposing shield terminal, a second shield terminal, a second opposing shield terminal, a first side shield terminal, a second side shield terminal, and a common side shield terminal. The first element includes a first shield, a first opposing shield, a first side shield, a first opposing side shield, and a first magnetic member. A direction from the first shield to the first opposing shield is along a first direction. A first crossing direction from the first opposing side shield to the first side shield crosses the first direction. The first magnetic member is provided between the first shield and the first opposing shield and between the first side shield and the first opposing side shield. The second element includes a second shield, a second opposing shield, a second side shield, a second opposing side shield, and a second magnetic member. A direction from the second shield to the second opposing shield or a direction from the second opposing shield to the second shield is along the first direction. A second crossing direction from the second opposing side shield to the second side shield crosses the first direction. The second magnetic member is provided between the second shield and the second opposing shield and between the second side shield and the second opposing side shield. The first shield terminal is electrically connected to the first shield. The first opposing shield terminal is electrically connected to the first opposing shield. The second shield terminal is electrically connected to the second shield. The second opposing shield terminal is electrically connected to the second opposing shield. The first side shield terminal is electrically connected to the first side shield. The second side shield terminal is electrically connected to the second side shield. The common side shield terminal is electrically connected to the first opposing side shield and the second opposing side shield.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

FIG. 1 is a schematic cross-sectional view illustrating a magnetic head according to a first embodiment.

As shown in FIG. 1, a magnetic head 110 according to the embodiment includes a first element EL1, a second element EL2, and a plurality of terminals. The magnetic head 110 includes a reproducing section 70. The first element EL1, the second element EL2, and the plurality of terminals are included in the reproducing section 70.

The first element EL1 includes a first shield 41a, a first opposing shield 41b, a first side shield 41s, a first opposing side shield 41r, and a first magnetic member 11. The second element EL2 includes a second shield 42a, a second opposing shield 42b, a second side shield 42s, a second opposing side shield 42r, and a second magnetic member 12.

A direction from the first shield 41a to the first opposing shield 41b is along a first direction D1. The first direction D1 is defined as an X-axis direction. One direction perpendicular to the X-axis direction is defined as a Y-axis direction. A direction perpendicular to the X-axis direction and the Y-axis direction is defined as a Z-axis direction.

The X-axis direction is, for example, along the down-track direction of the magnetic head 110. The Y-axis direction is along the cross-track direction. The Z-axis direction is along the height direction.

A first crossing direction Dx1 from the first opposing side shield 41r to the first side shield 41s crosses the first direction D1. The first crossing direction Dx1 may be along the Y-axis direction, for example. An orientation of the first crossing direction Dx1 may be the same as or opposite to the orientation of the Y-axis direction.

The first magnetic member 11 is provided between the first shield 41a and the first opposing shield 41b, and between the first side shield 41s and the first opposing side shield 41r.

A direction from the second shield 42a to the second opposing shield 42b or a direction from the second opposing shield 42b to the second shield 42a is along the first direction D1.

A second crossing direction Dx2 from the second opposing side shield 42r to the second side shield 42s crosses the first direction D1. The second crossing direction Dx2 may be along the Y-axis direction, for example. An orientation of the second crossing direction Dx2 may be the same as or opposite to the orientation of the Y-axis direction.

The second magnetic member 12 is provided between the second shield 42a and the second opposing shield 42b, and between the second side shield 42s and the second opposing side shield 42r.

The plurality of terminals include a first shield terminal 21a, a first opposing shield terminal 21b, a second shield terminal 22a, a second opposing shield terminal 22b, a first side shield terminal 21s, a second side shield terminal 22s, and a common side shield terminal 20T.

The first shield terminal 21a is electrically connected to the first shield 41a. The first opposing shield terminal 21b is electrically connected to the first opposing shield 41b. The second shield terminal 22a is electrically connected to the second shield 42a. The second opposing shield terminal 22b is electrically connected to the second opposing shield 42b. The first side shield terminal 21s is electrically connected to the first side shield 41s. The second side shield terminal 22s is electrically connected to the second side shield 42s. The common side shield terminal 20T is electrically connected to the first opposing side shield 41r and the second opposing side shield 42r.

A direction from the first element EL1 to the second element EL2 is along the first direction D1.

As shown in FIG. 1, a control circuit 50C may be connected to the magnetic head 110. In this example, the control circuit 50C includes a first detection circuit 51v, a second detection circuit 52v, a first current circuit 51a, and a second current circuit 52a. A magnetic recording device 120 according to the embodiment includes the magnetic head 110 and the control circuit 50C.

The first detection circuit 51v is configured to detect a first electrical signal between the first shield terminal 21a and the first opposing shield terminal 21b. The second detection circuit 52v is configured to detect a second electrical signal between the second shield terminal 22a and the second opposing shield terminal 22b. The first current circuit 51a is configured to supply a first current between the first side shield terminal 21s and the common side shield terminal 20T. The second current circuit 52a is configured to supply a second current between the second side shield terminal 22s and the common side shield terminal 20T.

The first current and the second current may include a DC component. The first current and the second current may be direct currents.

In the embodiment, a first conductive member 11c may be provided. A part of the first conductive member 11c is provided between the first shield 41a and the first magnetic member 11. Another part of the first conductive member 11c is provided between the first opposing shield 41b and the first magnetic member 11. Another part of the first conductive member 11c is provided between the first side shield 41s and the first magnetic member 11. Another part of the first conductive member 11c is provided between the first opposing side shield 41r and the first magnetic member 11.

The first magnetic member 11 is electrically connected to the first shield 41a and the first opposing shield 41b via the first conductive member 11c. The first magnetic member 11 is electrically connected to the first side shield 41s and the first opposing side shield 41r via the first conductive member 11c.

In the embodiment, the first current flows through the first magnetic member 11 via the first side shield 41s and the first opposing side shield 41r. In the state where the first current flows, a signal (for example, a voltage signal) generated between the first shield 41a and the first opposing shield 41b changes depending on the detection target magnetic field applied to the first element EL1. By detecting the change in the signal, the detection target magnetic field can be detected. The detection magnetic field is, for example, magnetization of a magnetic recording medium.

In the embodiment, a second conductive member 12c may be provided. A part of the second conductive member 12c is provided between the second shield 42a and the second magnetic member 12. Another part of the second conductive member 12c is provided between the second opposing shield 42b and the second magnetic member 12. Another part of the second conductive member 12c is provided between the second side shield 42s and the second magnetic member 12. Another part of the second conductive member 12c is provided between the second opposing side shield 42r and the second magnetic member 12.

The second magnetic member 12 is electrically connected to the second shield 42a and the second opposing shield 42b via the second conductive member 12c. The second magnetic member 12 is electrically connected to the second side shield 42s and the second opposing side shield 42r via the second conductive member 12c.

In the embodiment, the second current flows through the second magnetic member 12 via the second side shield 42s and the second opposing side shield 42r. In the state where the second current flows, a signal (for example, a voltage signal) generated between the second shield 42a and the second opposing shield 42b changes depending on the detection target magnetic field applied to the second element EL2. By detecting the change in the signal, the detection target magnetic field can be detected. The detection target magnetic field is, for example, magnetization of a magnetic recording medium.

In the embodiment, the plurality of elements are used to detect information recorded on the magnetic recording medium. It is possible to reproduce high-density information with higher precision.

In the magnetic head 110, the common side shield terminal 20T is provided. The common side shield terminal 20T is commonly connected to each side shield of the plurality of elements. On the other hand, a reference example may be considered in which independent terminals are provided for each of the plurality of elements. In the reference example, the number of terminals and wires connected to them is large. As wiring becomes complicated, characteristics tend to deteriorate. It is difficult to improve the reproducible recording density. The size of the reproducing section 70 tends to become large. It is difficult to reduce costs.

On the other hand, in the embodiment, the number of terminals can be reduced compared to the reference example. This simplifies the wiring and suppresses deterioration of characteristics. Information with high recording density can be reproduced with high precision. The size of the reproducing section 70 can be easily reduced. Low costs can be obtained. According to the embodiment, a magnetic head with improved performance can be provided.

In the embodiment, the first conductive member 11c and the second conductive member 12c may be provided as necessary or may be omitted. As shown in FIG. 1, in the first element EL1, a first insulating member 31i may be provided between the shield and the side shield. In the second element EL2, a second insulating member 32i may be provided between the shield and the side shield.

As described above, the voltage generated changes depending on the detection target magnetic field. This voltage change may be based on, for example, the anomalous Hall effect (AHE). For example, the first magnetic member 11 and the second magnetic member 12 may have the anomalous Hall effect.

For example, the first magnetic member 11 and the second magnetic member 12 may include at least one selected from the group consisting of CoMnGa, CoMnAl, and FePt. In such materials, it is easy to obtain a large anomalous Hall effect. For example, it is easy to obtain a large detection output. CoMnGa and CoMnAl are, for example, Heusler alloy materials.

In the magnetic head 110, when current flows in the direction from the first side shield 41s to the first opposing side shield 41r, the current flows in the direction from the second side shield 42s to the second opposing side shield 42r. As described later, the directions of these currents may be reversed.

Figure 2:
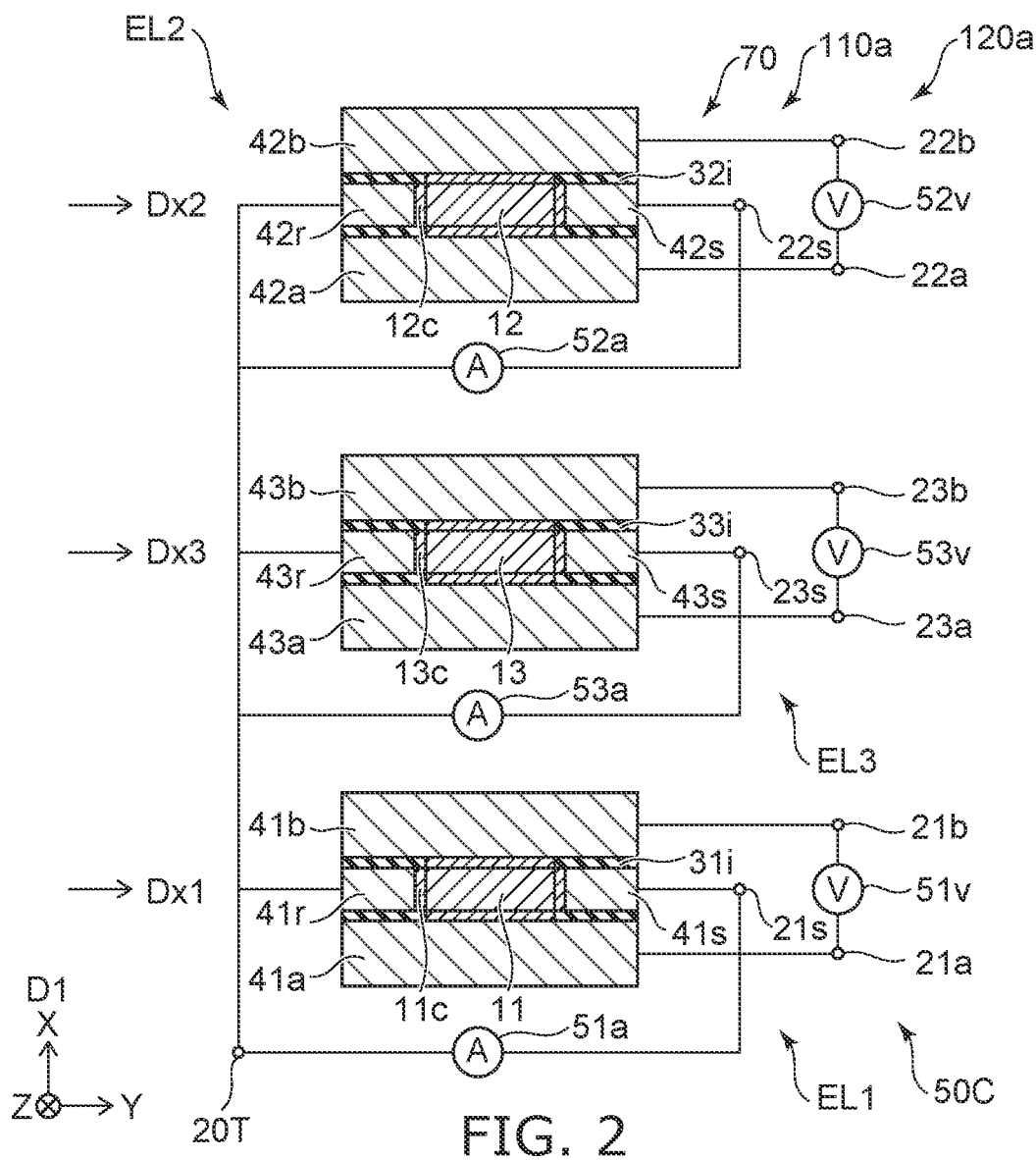
FIG. 2 is a schematic cross-sectional view illustrating a magnetic head according to the first embodiment.

FIG. 2 is a schematic cross-sectional view illustrating a magnetic head according to the first embodiment.

As shown in FIG. 2, a magnetic head 110a according to the embodiment further includes a third element EL3. The configuration of the magnetic head 110a except for this may be the same as the configuration of the magnetic head 110. The third element EL3 is also included in the reproducing section 70.

The third element EL3 includes a third shield 43a, a third opposing shield 43b, a third side shield 43s, a third opposing side shield 43r, and a third magnetic member 13.

A direction from the third shield 43a to the third opposing shield 43b or a direction from the third opposing shield 43b to the third shield 43a is along the first direction D1. A third crossing direction Dx3 from the third opposing side shield 43r to the third side shield 43s crosses the first direction D1. The third crossing direction Dx3 may be along the Y-axis direction, for example. An orientation of the third crossing direction Dx3 may be the same as or opposite to the orientation of the Y-axis direction.

The third magnetic member 13 is provided between the third shield 43a and the third opposing shield 43b, and between the third side shield 43s and the third opposing side shield 43r. The material of the third magnetic member 13 may be substantially the same as the material of the first magnetic member 11, for example. The material of the third magnetic member 13 may be different from the materials of the other magnetic members, for example.

The plurality of terminals include a third shield terminal 23a, a third opposing shield terminal 23b, and a third side shield terminal 23s. The third shield terminal 23a is electrically connected to the third shield 43a. The third opposing shield terminal 23b is electrically connected to the third opposing shield 43b. The third side shield terminal 23s is electrically connected to the third side shield 43s. The common side shield terminal 20T is further electrically connected to the third opposing side shield 43r.

Also, in the magnetic head 110a, the wiring becomes simple and deterioration of characteristics is suppressed. Information with high recording density can be reproduced with high precision. The size of the reproducing section 70 can be easily reduced. Low costs can be obtained. According to the embodiment, a magnetic head with improved performance can be provided.

A direction from the first element EL1 to the third element EL3 is along the first direction D1. The third element EL3 may be provided, for example, between the first element EL1 and the second element EL2. The second element EL2 may be provided between the first element EL1 and the third element EL3.

As shown in FIG. 2, the control circuit 50C includes a third detection circuit 53v and a third current circuit 53a. The third detection circuit 53v is configured to detect a third electrical signal between the third shield terminal 23a and the third opposing shield terminal 23b. The third current circuit 53a is configured to supply a third current between the third side shield terminal 23s and the common side shield terminal 20T. The third current may include a direct current component.

In the third element EL3, a third conductive member 13c may be provided. A part of the third conductive member 13c is provided between the third shield 43a and the third magnetic member 13. Another part of the third conductive member 13c is provided between the third opposing shield 43b and the third magnetic member 13. Another part of the third conductive member 13c is provided between the third side shield 43s and the third magnetic member 13. Another part of the third conductive member 13c is provided between the third opposing side shield 43r and the third magnetic member 13. In the third element EL3, a third insulating member 33i may be provided between the shield and the side shield.

The third magnetic member 13 is electrically connected to the third shield 43a and the third opposing shield 43b via the third conductive member 13c. The third magnetic member 13 is electrically connected to the third side shield 43s and the third opposing side shield 43r via the third conductive member 13c.

In the embodiment, the third current flows through the third magnetic member 13 via the third side shield 43s and the third opposing side shield 43r. In the state where the third current flows, a signal (for example, a voltage signal)

generated between the third shield 43a and the third opposing shield 43b changes depending on the detection target magnetic field applied to the third element EL3. By detecting the change in the signal, the detection target magnetic field can be detected.

Figure 3:
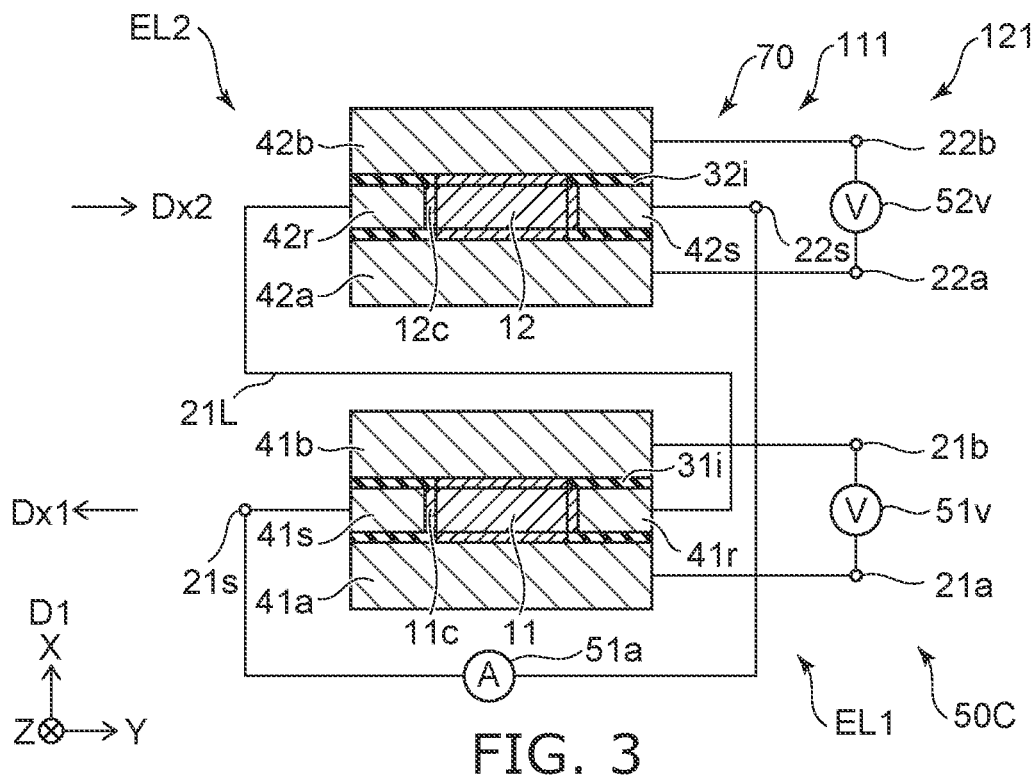
FIG. 3 is a schematic cross-sectional view illustrating a magnetic head according to the first embodiment.

FIG. 3 is a schematic cross-sectional view illustrating a magnetic head according to the first embodiment.

As shown in FIG. 3, a magnetic head 111 according to the embodiment includes the first element EL1, the second element EL2, and the plurality of terminals. In the magnetic head 111, the configurations of the first element EL1 and the second element EL2 may be same as those in the magnetic head 110.

The plurality of terminals include the first shield terminal 21a, the first opposing shield terminal 21b, the second shield terminal 22a, the second opposing shield terminal 22b, the first side shield terminal 21s, and the second side shield terminal 22s. The first shield terminal 21a is electrically connected to the first shield 41a. The first opposing shield terminal 21b is electrically connected to the first opposing shield 41b. The second shield terminal 22a is electrically connected to the second shield 42a. The second opposing shield terminal 22b is electrically connected to the second opposing shield 42b. The first side shield terminal 21s is electrically connected to the first side shield 41s. The second side shield terminal 22s is electrically connected to the second side shield 42s.

The first opposing side shield 41r is electrically connected to the second opposing side shield 42r. In this example, a first wiring 21L is provided. The first wiring 21L electrically connects the first opposing side shield 41r to the second opposing side shield 42r.

The control circuit 50C includes the first detection circuit 51v, the second detection circuit 52v, and the first current circuit 51a. The first detection circuit 51v is configured to detect the first electrical signal between the first shield terminal 21a and the first opposing shield terminal 21b. The second detection circuit 52v is configured to detect the second electrical signal between the second shield terminal 22a and the second opposing shield terminal 22b. The first current circuit 51a is configured to supply the first current between the first side shield terminal 21s and the second side shield terminal 22s.

In this example, the first element EL1 and the second element EL2 are connected in series. The current that has passed through the first element EL1 passes through the second element EL2.

Also in the magnetic head 111, the wiring becomes simple and deterioration of characteristics is suppressed. Information with high recording density can be reproduced with high precision. A magnetic head with improved performance can be provided.

In the magnetic head 111, when current flows in the direction from the first side shield 41s to the first opposing side shield 41r, the current flows in the direction from the second opposing side shield 42r to the second side shield 42s.

Figure 4:
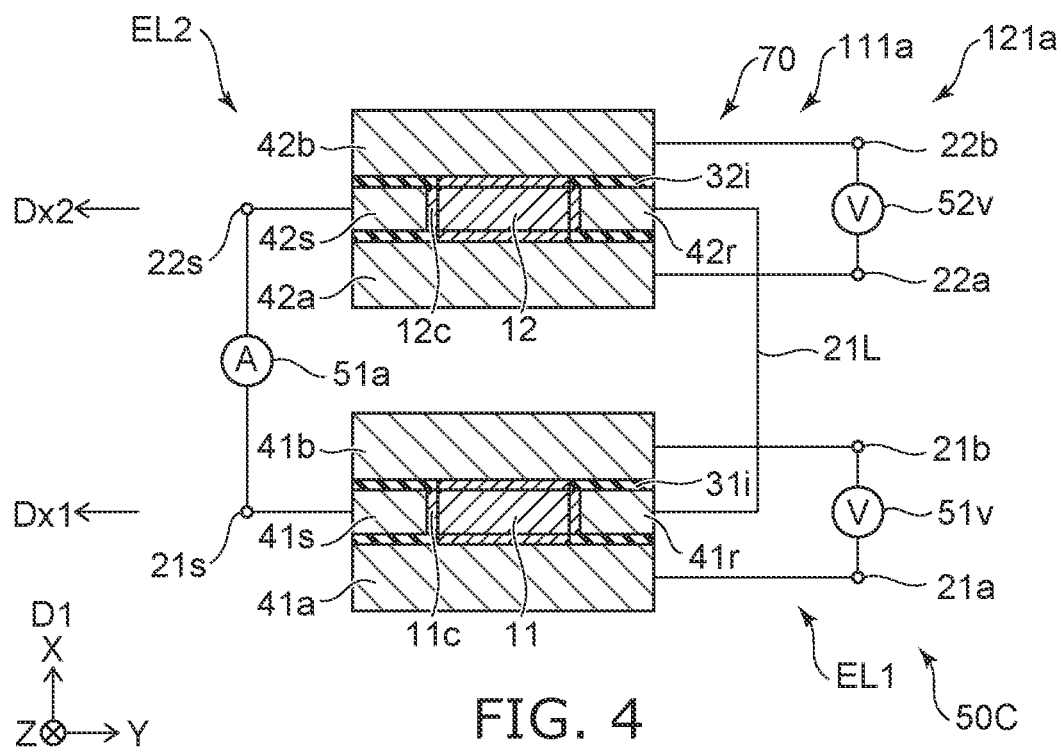
FIG. 4 is a schematic cross-sectional view illustrating a magnetic head according to the first embodiment.

FIG. 4 is a schematic cross-sectional view illustrating a magnetic head according to the first embodiment.

As shown in FIG. 4, a magnetic head 111a according to the embodiment includes the first element EL1, the second element EL2, and the plurality of terminals. In the magnetic head 111a, the configuration of the side shield is different from that in the magnetic head 111. The configuration of the magnetic head 111a except for this may be the same as the configuration of the magnetic head 111.

In the magnetic head 111a, when current flows in the direction from the first side shield 41s to the first opposing side shield 41r, the current flows in the direction from the second opposing side shield 42r to the second side shield 42s.

Figure 5:
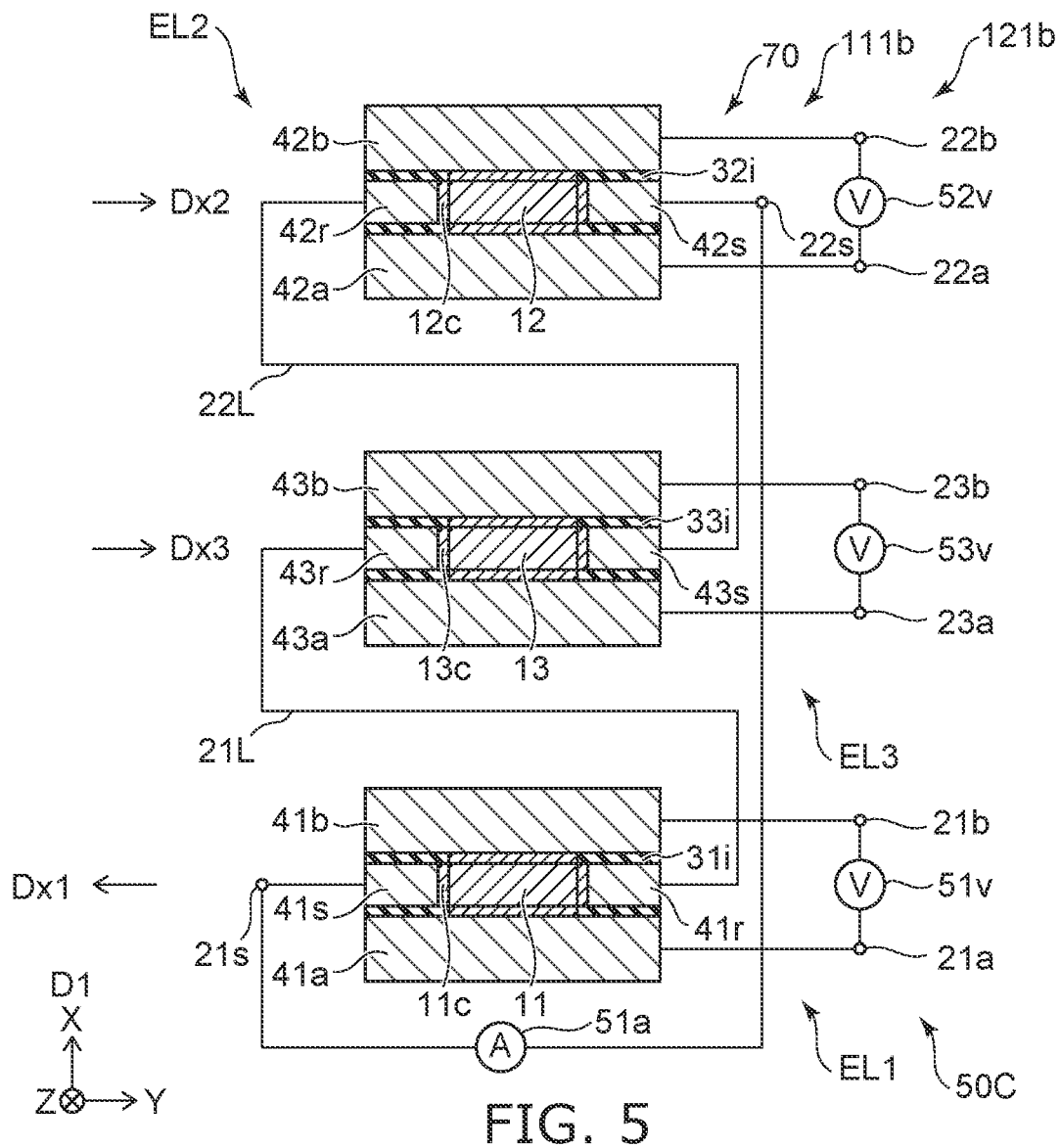
FIG. 5 is a schematic cross-sectional view illustrating a magnetic head according to the first embodiment.

FIG. 5 is a schematic cross-sectional view illustrating a magnetic head according to the first embodiment.

As shown in FIG. 5, a magnetic head 111b according to the embodiment further includes the third element EL3. The configuration of the third element EL3 in the magnetic head 111b may be the same as the configuration of the third element EL3 in the magnetic head 110a.

In the magnetic head 111b, the plurality of terminals include the third shield terminal 23a electrically connected to the third shield 43a, the third opposing shield terminal 23b electrically connected to the third opposing shield 43b, and the third side shield terminal 23s electrically connected to the third side shield 43s.

In the magnetic head 111b, the first opposing side shield 41r is electrically connected to the third opposing side shield 43r. The third side shield 43s is electrically connected to the second opposing side shield 42r.

In this example, the first wiring 21L and a second wiring 22L are provided. The first wiring 21L electrically connects the first opposing side shield 41r to the third opposing side shield 43r. The second wiring 22L electrically connects the third side shield 43s to the second opposing side shield 42r. The first opposing side shield 41r is electrically connected to the second opposing side shield 42r by the first wiring 21L and the second wiring 22L. The third element EL3 can be considered as a conductor. The first wiring 21L is electrically connected to the second opposing side shield 42r via the third element EL3 and the second wiring 22L.

Also, in the magnetic head 111b, the wiring becomes simple and deterioration of characteristics is suppressed. Information with high recording density can be reproduced with high precision. A magnetic head with improved performance can be provided.

Figure 6:
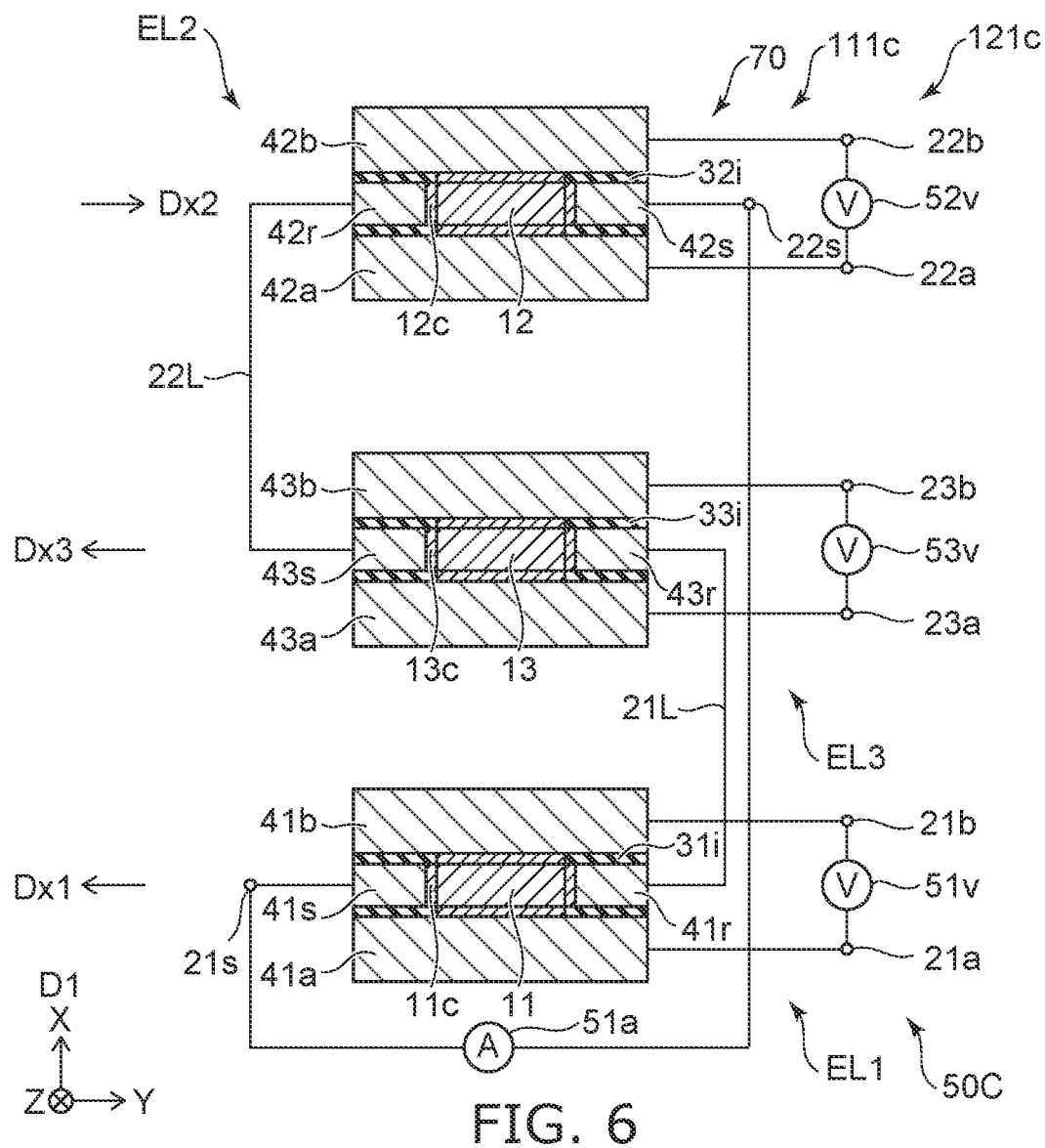
FIG. 6 is a schematic cross-sectional view illustrating a magnetic head according to the first embodiment.

FIG. 6 is a schematic cross-sectional view illustrating a magnetic head according to the first embodiment.

As shown in FIG. 6, in a magnetic head 111c according to the embodiment, the position of the side shield in the third element EL3 is different from the position of the side shield in the magnetic head 111b. The configuration of the magnetic head 111c except for this may be the same as the configuration of the magnetic head 111b.

In the magnetic head 111b and the magnetic head 111c, in the case where the current flows in the direction from the first side shield 41s to the first opposing side shield 41r, the current flows in the direction from the third opposing side shield 43r to the third side shield 43s, and the current flows in the direction from the second opposing side shield 42r to the second side shield 42s.

In the case where the direction of current flowing in the plurality of elements is the same, as the signs of the output signals for the detection target magnetic field are the same, signal processing after signal detection becomes easy. On the other hand, in the case where the direction of current in one of the plurality of elements is different from the direction of current in other one of the plurality of elements, the wiring can be shortened and the characteristics can be easily improved. In this case, for example, after signal detection, signal processing may be performed to change the sign of the output signal for the detection target magnetic field.

In the magnetic heads 111, 111a to 111c, the plurality of elements are electrically connected in series. The same current flows through the plurality of elements. This suppresses the influence of current differences on signals generated by the plurality of elements. High-precision reproduction becomes possible.

Figure 7:
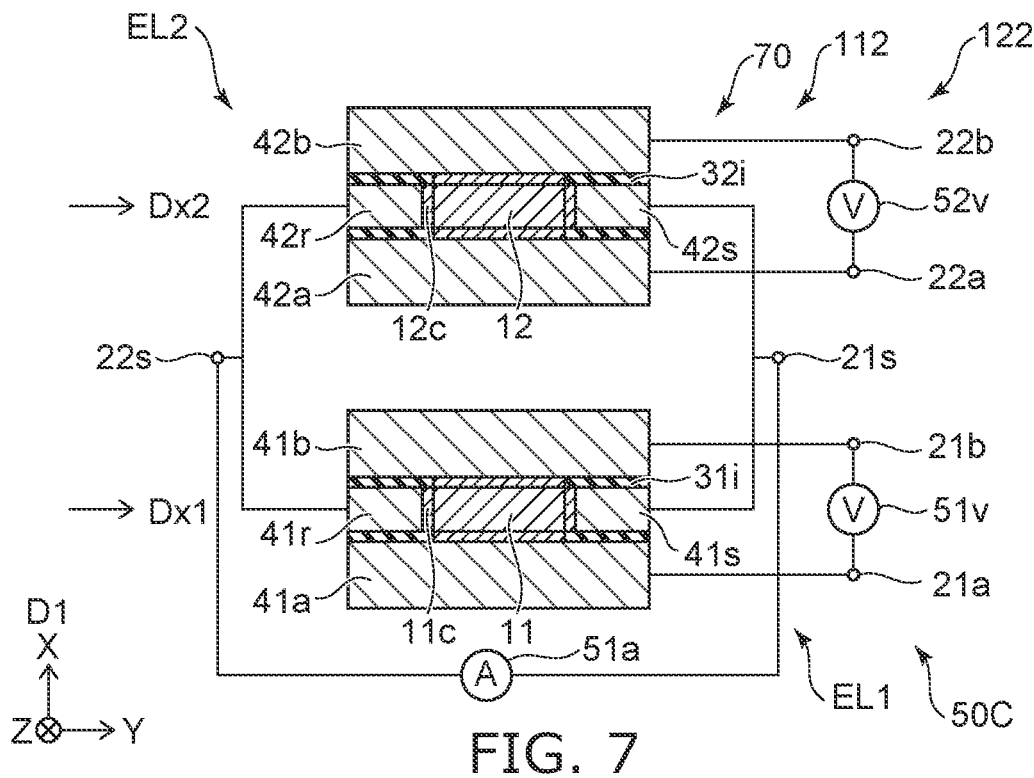
FIG. 7 is a schematic cross-sectional view illustrating a magnetic head according to the first embodiment.

FIG. 7 is a schematic cross-sectional view illustrating a magnetic head according to the first embodiment.

As shown in FIG. 7, in a magnetic head 112 according to the embodiment, the connection of the plurality of elements is different from that in the magnetic head 111. The configuration of the magnetic head 112 except for this may be the same as the configuration of the magnetic head 111.

In the magnetic head 112, the plurality of terminals include the first shield terminal 21a electrically connected to the first shield 41a, the first opposing shield terminal 21b electrically connected to the first opposing shield 41b, the second shield terminal 22a electrically connected to the second shield, the second opposing shield terminal 22b electrically connected to the second opposing shield 42b, the first side shield terminal 21s, and a second side shield terminal 22s.

In the magnetic head 112, the first side shield terminal 21s is electrically connected to the first side shield 41s and the second side shield 42s. The second side shield terminal 22s is electrically connected to the first opposing side shield 41r and the second opposing side shield 42r.

The first element EL1 is connected in parallel with the second element EL2. For example, even if an abnormality occurs in one of the plurality of elements, normal detection (reproduction) can be performed in another one of the plurality of elements.

Figure 8:
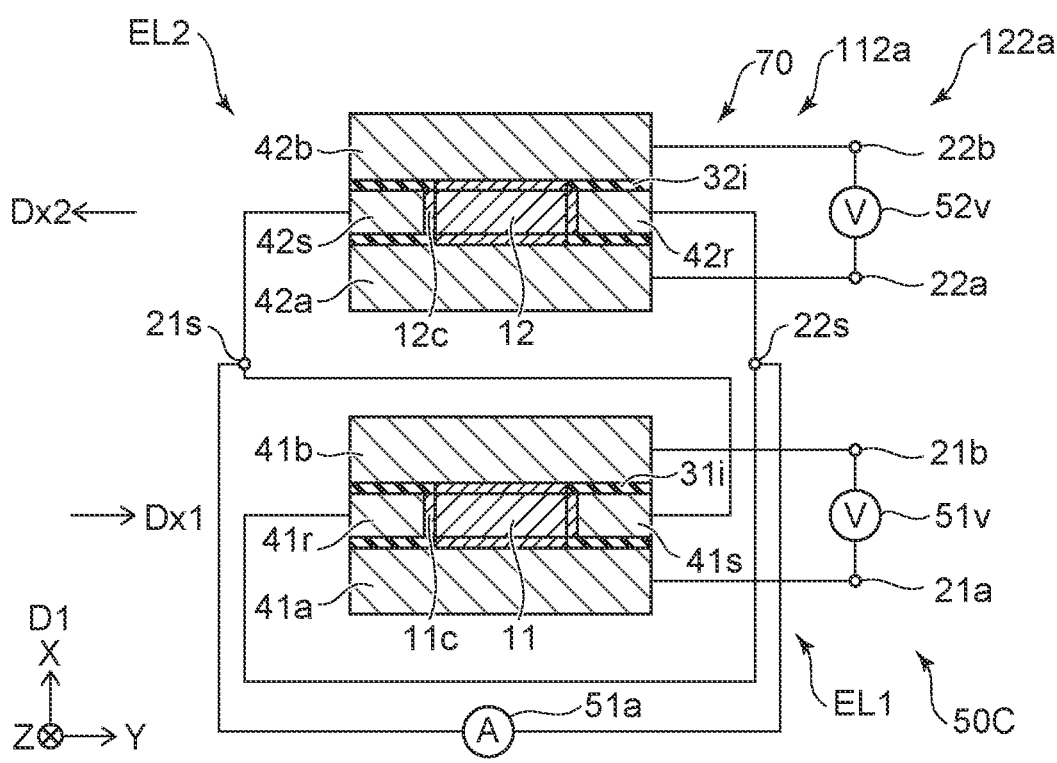
FIG. 8 is a schematic cross-sectional view illustrating a magnetic head according to the first embodiment.

FIG. 8 is a schematic cross-sectional view illustrating a magnetic head according to the first embodiment.

As shown in FIG. 8, in a magnetic head 112a according to the embodiment, the positions of the side shields in the plurality of elements are different from those in the magnetic head 112. The configuration of the magnetic head 112a except for this may be the same as the configuration of the magnetic head 112.

In the magnetic head 112 and the magnetic head 112a, in the case where the current flows in the direction from the first side shield 41s to the first opposing side shield 41r, the current flows in the direction from the second side shield 42s to the second opposing side shield 42r.

Figure 9:
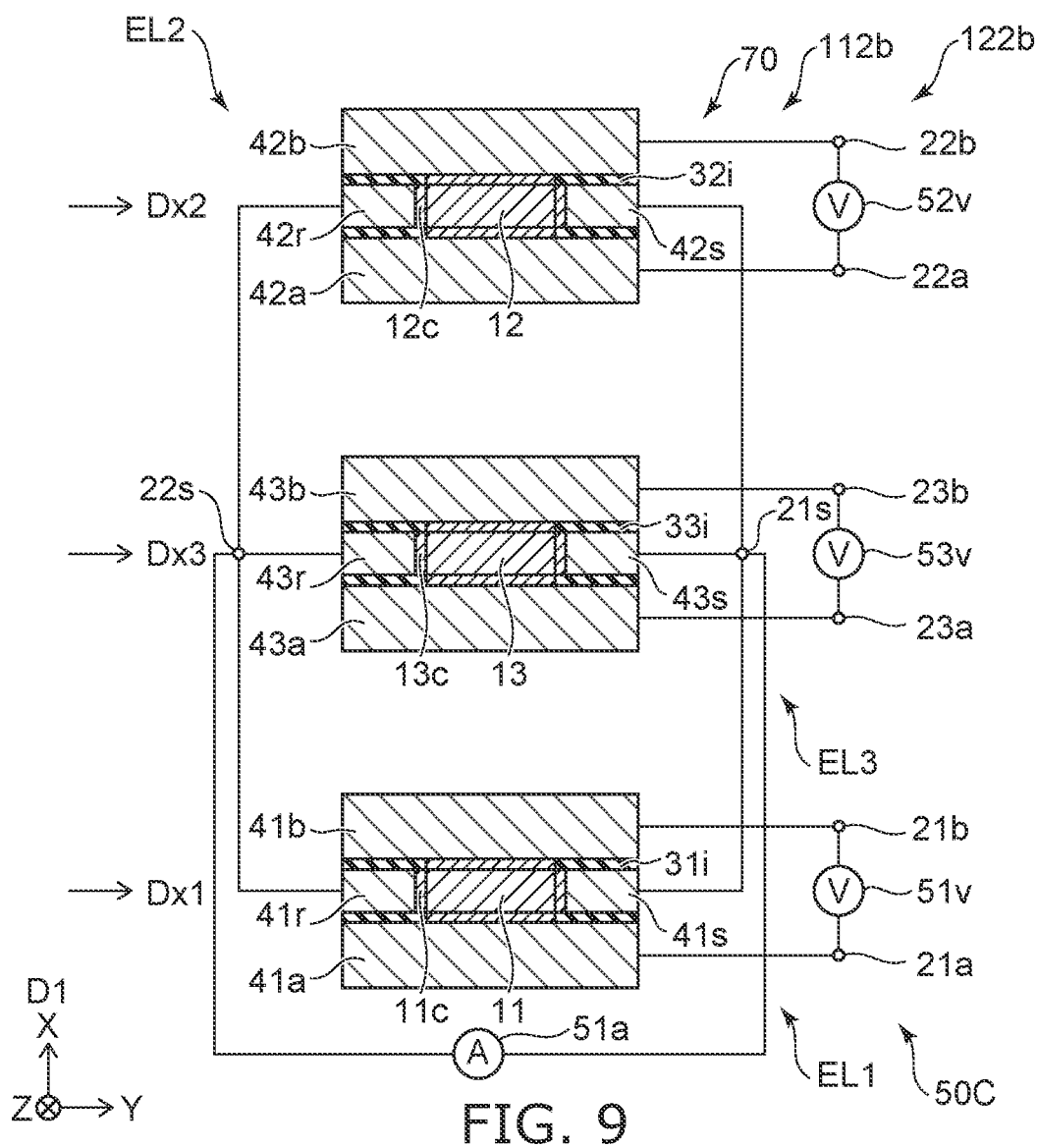
FIG. 9 is a schematic cross-sectional view illustrating a magnetic head according to the first embodiment.

FIG. 9 is a schematic cross-sectional view illustrating a magnetic head according to the first embodiment.

As shown in FIG. 9, in a magnetic head 112b according to the embodiment, the third element EL3 and the plurality of terminals are provided. The configuration of the magnetic head 112b except for this may be the same as the configuration of the magnetic head 112.

In the magnetic head 112b, the first side shield terminal 21s is further connected to the third side shield 43s. The second side shield terminal 22s is further connected to the third opposing side shield 43r.

Figure 10:
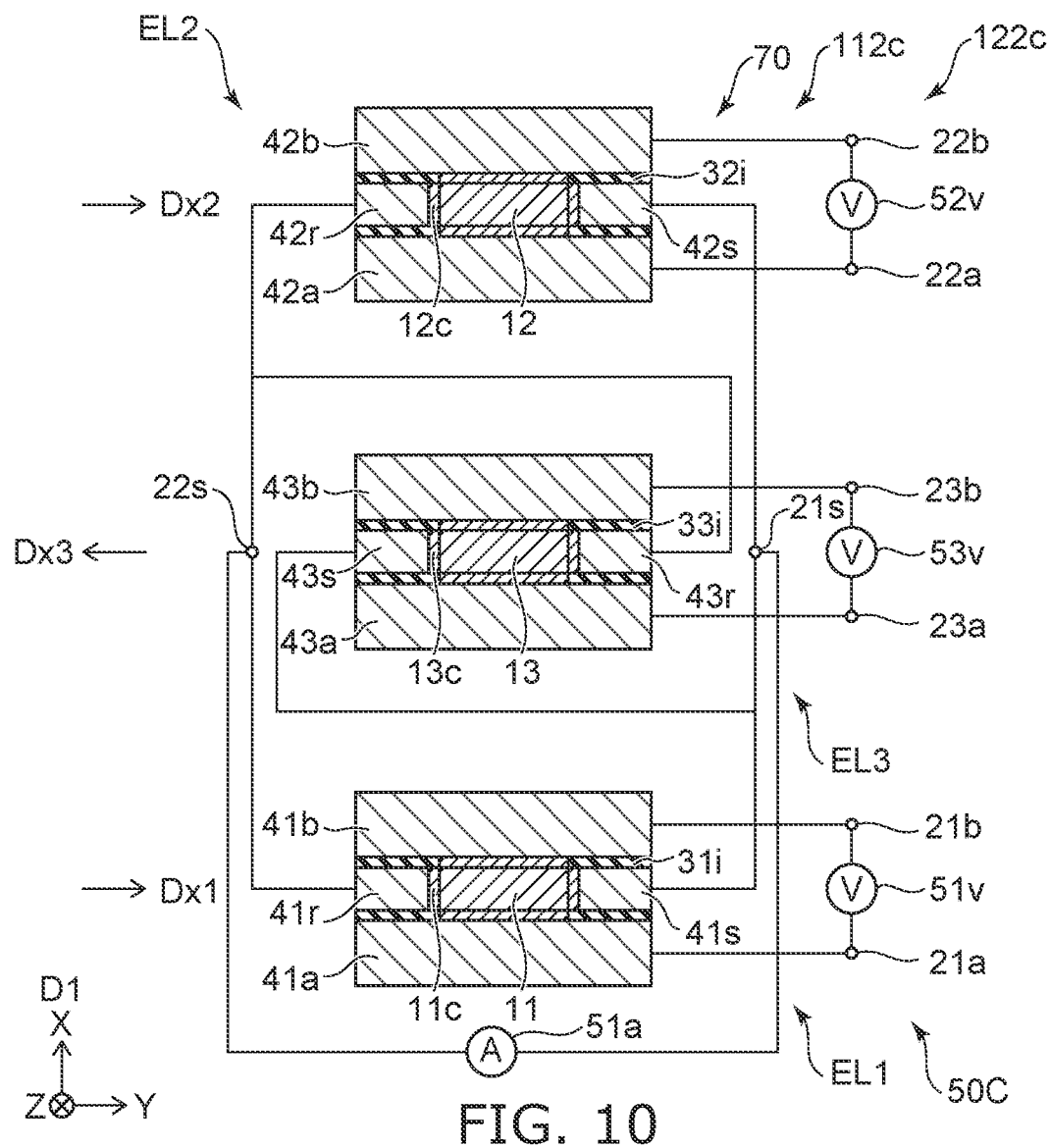
FIG. 10 is a schematic cross-sectional view illustrating a magnetic head according to the first embodiment.

FIG. 10 is a schematic cross-sectional view illustrating a magnetic head according to the first embodiment.

As shown in FIG. 10, in a magnetic head 112c according to the embodiment, the position of the side shield is different from that in the magnetic head 112b. The configuration of the magnetic head 112c except for this may be the same as the configuration of the magnetic head 112b.

In the magnetic head 112b and the magnetic head 112c, the first element EL1, the second element EL2, and the third element EL3 are electrically connected in parallel.

In the magnetic head 112b and the magnetic head 112c, in the case where the current flows in the direction from the first side shield 41s to the first opposing side shield 41r, the current flows in the direction from the third side shield 43s to the third opposing side shield 43r, and the current flows in the direction from the second side shield 42s to the second opposing side shield 42r.

Figure 11:
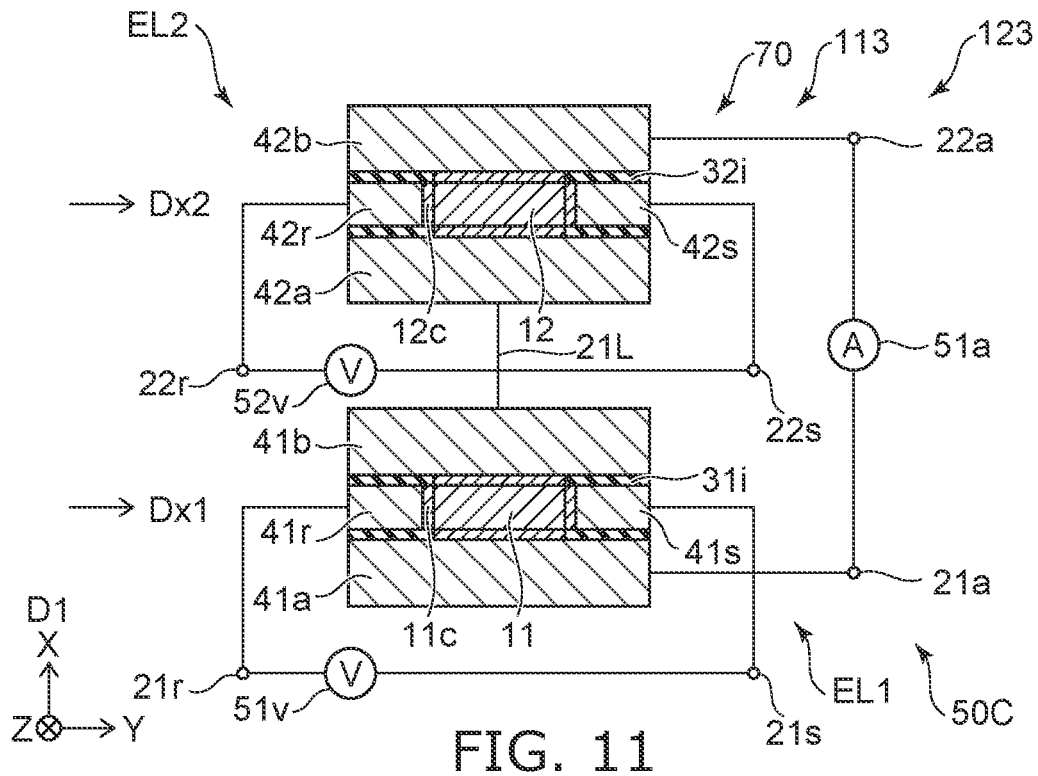
FIG. 11 is a schematic cross-sectional view illustrating a magnetic head according to the first embodiment.

FIG. 11 is a schematic cross-sectional view illustrating a magnetic head according to the first embodiment.

As shown in FIG. 11, in a magnetic head 113 according to the embodiment, the configuration of the plurality of terminals is different from that in the magnetic head 111. The configuration of the magnetic head 113 except for this may be the same as the configuration of the magnetic head 111.

Also in the magnetic head 113, the first element EL1, the second element EL2, and the plurality of terminals are provided. The plurality of terminals include the first side shield terminal 21s, the first opposing side shield terminal 21r, the second side shield terminal 22s, and the second opposing side shield terminal 22r.

The first side shield terminal 21s is electrically connected to the first side shield 41s. The first opposing side shield terminal 21r is electrically connected to the first opposing side shield 41r. The second side shield terminal 22s is electrically connected to the second side shield 42s. The second opposing side shield terminal 22r is electrically connected to the second opposing side shield 42r. The first shield terminal 21a is electrically connected to the first shield 41a. The second shield terminal 22a is electrically connected to one of the second opposing shield 42b and the second shield 42a. The other of the second opposing shield 42b and the second shield 42a is electrically connected to the first opposing shield 41b.

In this example, the second shield terminal 22a is electrically connected to the second opposing shield 42b. The second shield 42a is electrically connected to the first opposing shield 41b by the first wiring 21L. The first wiring 21L may be omitted. In this case, the second shield 42a is directly electrically connected to the first opposing shield 41b.

In this example, the current flows along the first direction D1. Meanwhile, a signal between the side shield and the opposing side shield is detected.

Also in the magnetic head 113, the wiring becomes simple and deterioration of characteristics is suppressed. Information with high recording density can be reproduced with high precision. A magnetic head with improved performance can be provided.

As shown in FIG. 11, the control circuit 50C includes the first detection circuit 51v, the second detection circuit 52v, and the first current circuit 51a. The first detection circuit 51v is configured to detect the first electrical signal between the first side shield terminal 21s and the first opposing side shield terminal 21r. The second detection circuit 52v is configured to detect the second electrical signal between the second side shield terminal 22s and the second opposing side shield terminal 22r. The first current circuit 51a is configured to supply the first current between the first shield terminal 21a and the second shield terminal 22a.

In the magnetic head 113, in the case where the current flows in the direction from the first shield 41a to the first opposing shield 41b, the current flows in the direction from the second shield 42a to the second opposing shield 42b.

Figure 12:
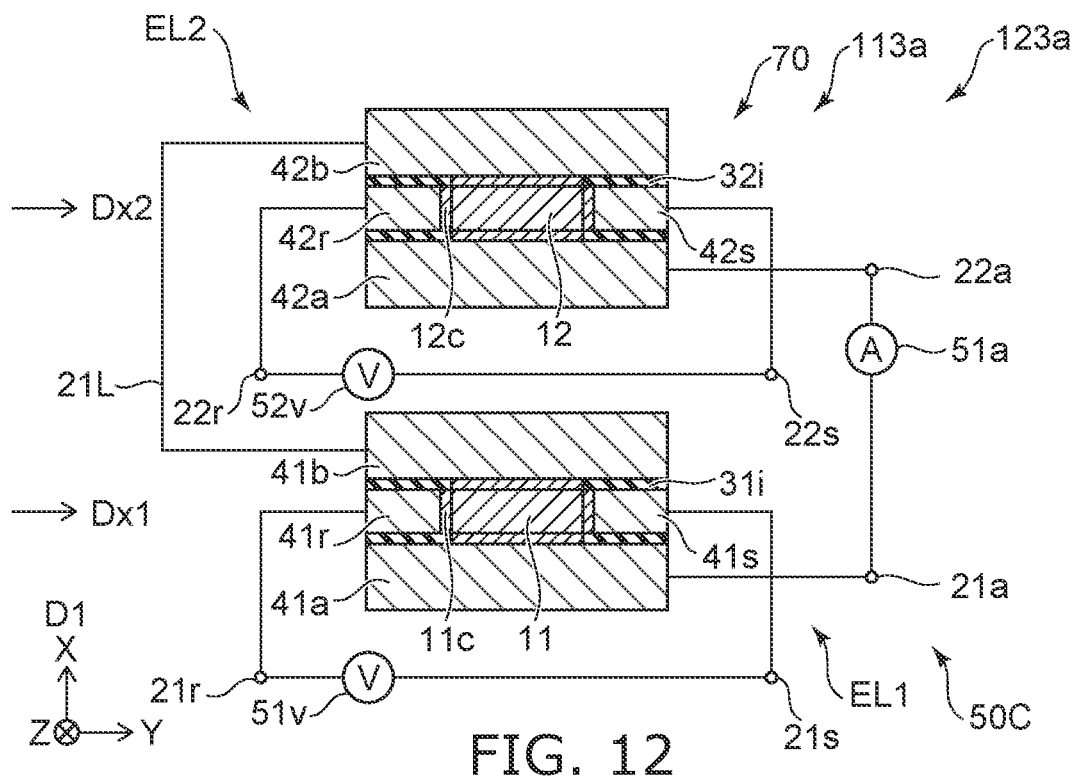
FIG. 12 is a schematic cross-sectional view illustrating a magnetic head according to the first embodiment.

FIG. 12 is a schematic cross-sectional view illustrating a magnetic head according to the first embodiment.

As shown in FIG. 12, in a magnetic head 113a according to the embodiment, the configuration of the plurality of terminals is different from that in the magnetic head 113. The configuration of the magnetic head 113a except for this may be the same as the configuration of the magnetic head 113.

In the magnetic head 113a, the second shield terminal 22a is electrically connected to one of the second opposing shield 42b and the second shield 42a. The other of the second opposing shield 42b and the second shield 42a is electrically connected to the first opposing shield 41b. In the magnetic head 113a, the second shield terminal 22a is electrically connected to the second shield 42a. The second shield 42a is electrically connected to the first opposing shield 41b by the second wiring 22L.

In the magnetic head 113a, in the case where the current flows in the direction from the first shield 41a to the first opposing shield 41b, the current flows in the direction from the second opposing shield 42b to the second shield 42a.

In the magnetic head 113 and the magnetic head 113a, the plurality of elements are electrically connected in series. The current flowing through one of the plurality of elements flows through another one of the plurality of elements. The same current flows through the plurality of elements. This suppresses the influence of current differences on signals generated by the plurality of elements. High-precision reproduction becomes possible.

Figure 13:
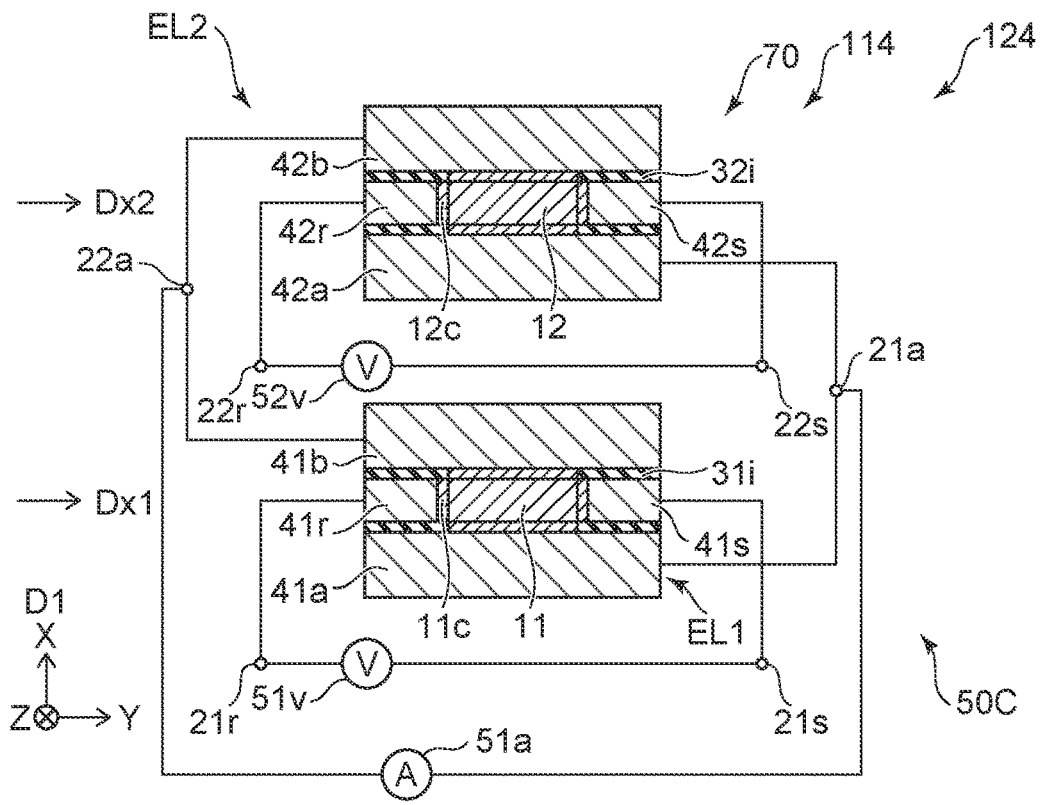
FIG. 13 is a schematic cross-sectional view illustrating a magnetic head according to the first embodiment.

FIG. 13 is a schematic cross-sectional view illustrating a magnetic head according to the first embodiment.

As shown in FIG. 13, in a magnetic head 114 according to the embodiment, the plurality of elements are connected in parallel. The configuration of the magnetic head 114 except for this may be the same as the configuration of the magnetic head 113.

Also in the magnetic head 114, the first side shield terminal 21s is electrically connected to the first side shield 41s. The first opposing side shield terminal 21r is electrically connected to the first opposing side shield 41r. The second side shield terminal 22s is electrically connected to the second side shield 42s. The second opposing side shield terminal 22r is electrically connected to the second opposing side shield 42r. The first shield terminal 21a is electrically connected to the first shield 41a. The second shield terminal 22a is electrically connected to the first opposing shield 41b.

The first shield terminal 21a is further electrically connected to one of the second shield 42a and the second opposing shield 42b. The second shield terminal 22a is further electrically connected to the other of the second shield 42a and the second opposing shield 42b. In this example, the first shield terminal 21a is electrically connected to the second shield 42a. The second shield terminal 22a is electrically connected to the second opposing shield 42b.

Also in the magnetic head 114, the wiring becomes simple and deterioration of characteristics is suppressed. Information with high recording density can be reproduced with high precision. A magnetic head with improved performance can be provided.

Figure 14:
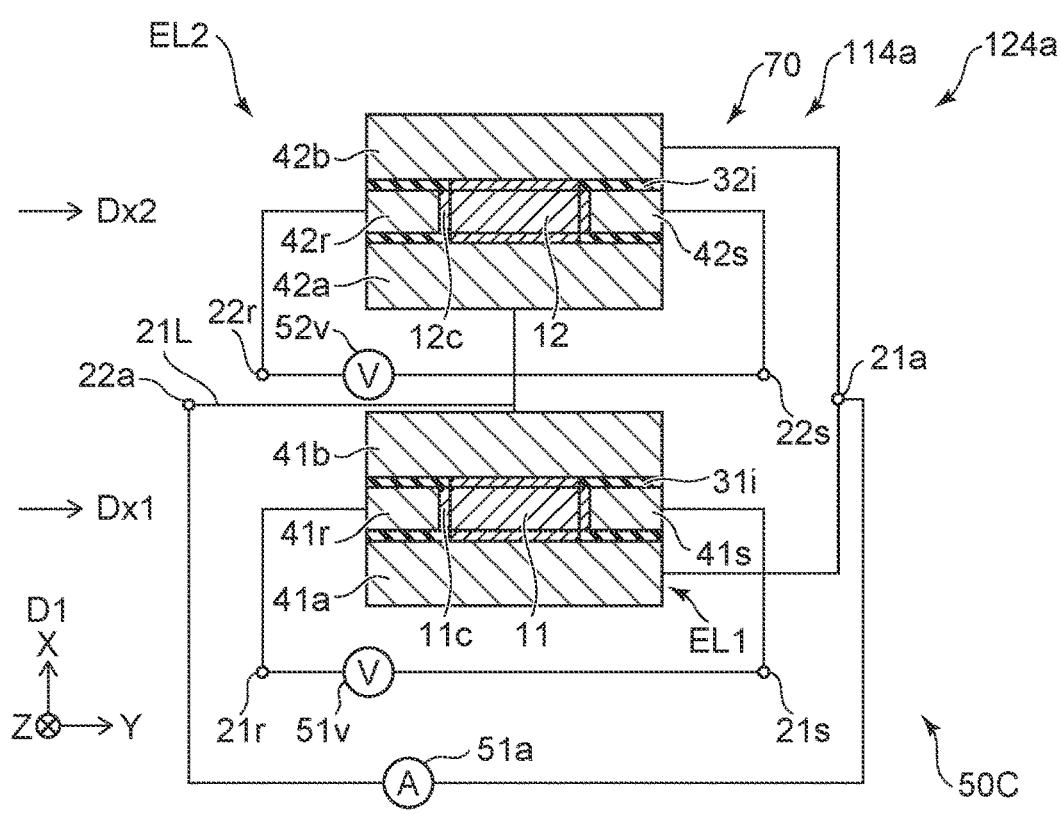
FIG. 14 is a schematic cross-sectional view illustrating a magnetic head according to the first embodiment.

FIG. 14 is a schematic cross-sectional view illustrating a magnetic head according to the first embodiment.

As shown in FIG. 14, in a magnetic head 114a according to the embodiment, the connection of the terminals is different from that in the magnetic head 114. The configuration of the magnetic head 114a except for this may be the same as the configuration of the magnetic head 114.

In the magnetic head 114a, the first shield terminal 21a is electrically connected to the second opposing shield 42b. The second shield terminal 22a is electrically connected to the second shield 42a.

In the magnetic head 114 and the magnetic head 114a, the plurality of elements are connected in parallel. For example, even when an abnormality occurs in one of the plurality of elements, normal detection (reproduction) can be performed in another one of the plurality of elements.

In the magnetic head 114 and the magnetic head 114a, the control circuit 50C includes the first detection circuit 51v, the second detection circuit 52v, and the first current circuit 51a. The first detection circuit 51v is configured to detect the first electrical signal between the first side shield terminal 21s and the first opposing side shield terminal 21r. The second detection circuit 52v is configured to detect the second electrical signal between the second side shield terminal 22s and the second opposing side shield terminal 22r. The first current circuit 51a is configured to supply the first current between the first shield terminal 21a and the second shield terminal 22a.

Figure 15:
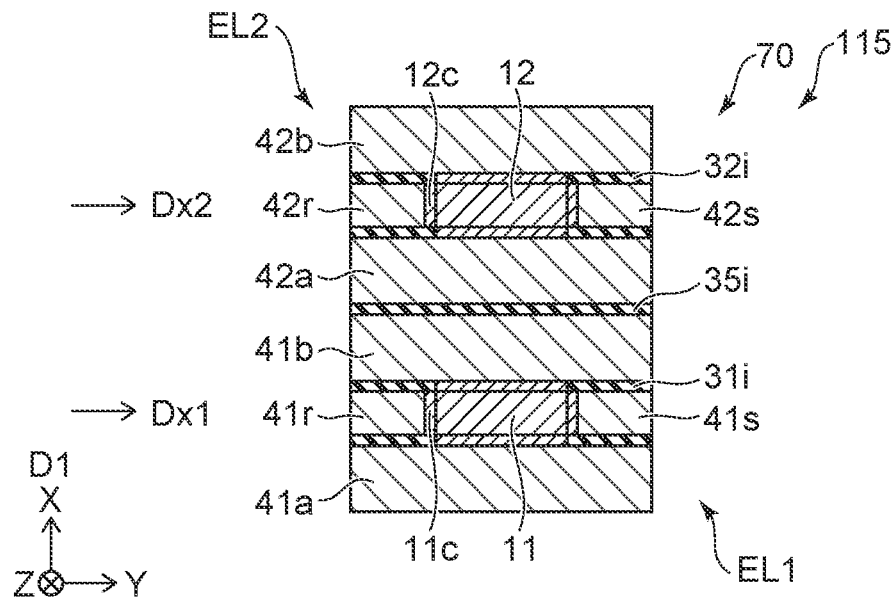
FIG. 15 is a schematic cross-sectional view illustrating a magnetic head according to the first embodiment.

FIG. 15 is a schematic cross-sectional view illustrating a magnetic head according to the first embodiment.

As shown in FIG. 15, in a magnetic head 115, the first element EL1 and the second element EL2 are integrated through the insulating film 35i.

Figure 16:
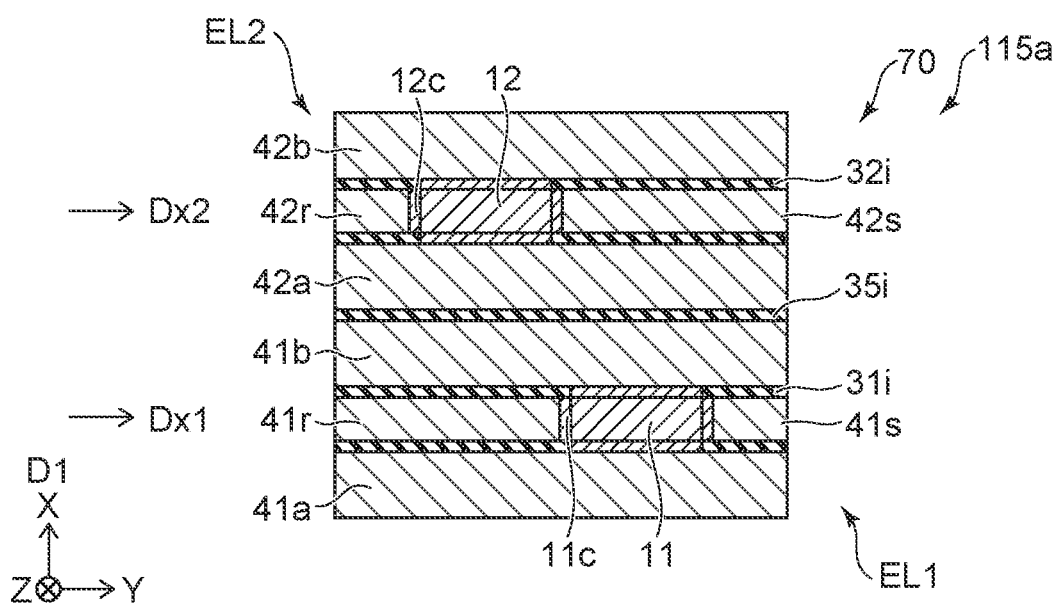
FIG. 16 is a schematic cross-sectional view illustrating a magnetic head according to the first embodiment.

FIG. 16 is a schematic cross-sectional view illustrating a magnetic head according to the first embodiment.

As shown in FIG. 16, in a magnetic head 115a, the position of the first magnetic member 11 in the Y-axis direction may be different from the position of the second magnetic member 12 in the Y-axis direction. For example, it is easy to deal with differences in skew. Detection (reproduction) with higher accuracy is easier.

Figure 17:
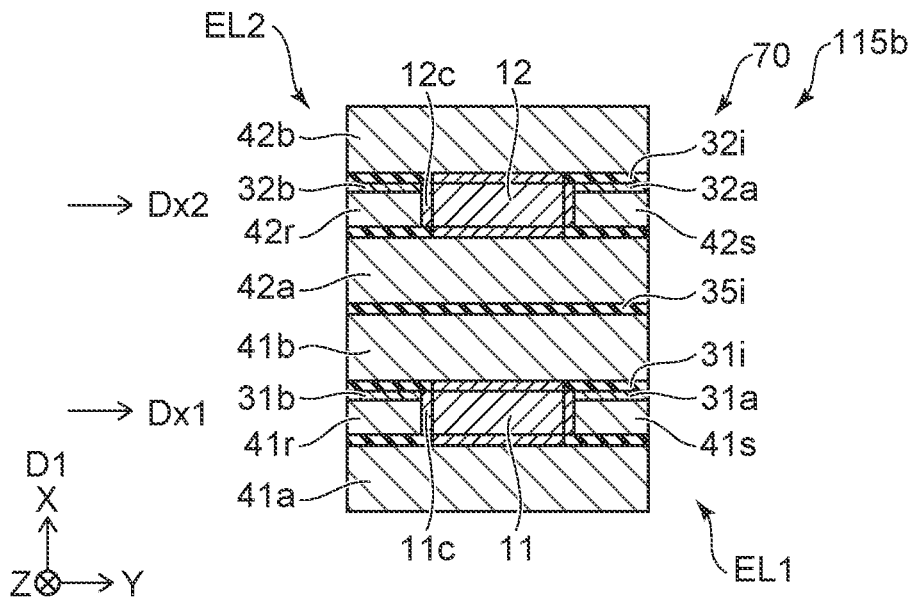
FIG. 17 is a schematic cross-sectional view illustrating a magnetic head according to the first embodiment.

FIG. 17 is a schematic cross-sectional view illustrating a magnetic head according to the first embodiment.

As shown in FIG. 17, in a magnetic head 115b, the first element EL1 further includes a first magnetic layer 31a. The first element EL1 may include a first opposing magnetic layer 31b. The first magnetic layer 31a and the first opposing magnetic layer 31b include at least one selected from the group consisting of IrMn, PtMn, FeMn, and NiMn. The first magnetic layer 31a is provided between the first side shield 41s and the first opposing shield 41b. The first opposing magnetic layer 31b is provided between the first opposing side shield 41r and the first opposing shield 41b.

For example, the first magnetic layer 31a and the first opposing magnetic layer 31b are antiferromagnetic layers. These magnetic layers stabilize the magnetization of the shield.

The second element EL2 may include a second magnetic layer 32a and a second opposing magnetic layer 32b. The second magnetic layer 32a and the second opposing magnetic layer 32b include at least one selected from the group consisting of IrMn, PtMn, FeMn, and NiMn. The second magnetic layer 32a is provided between the second side shield 42s and the second opposing shield 42b. The second opposing magnetic layer 32b is provided between the second opposing side shield 42r and the second opposing shield 42b.

Figure 18:
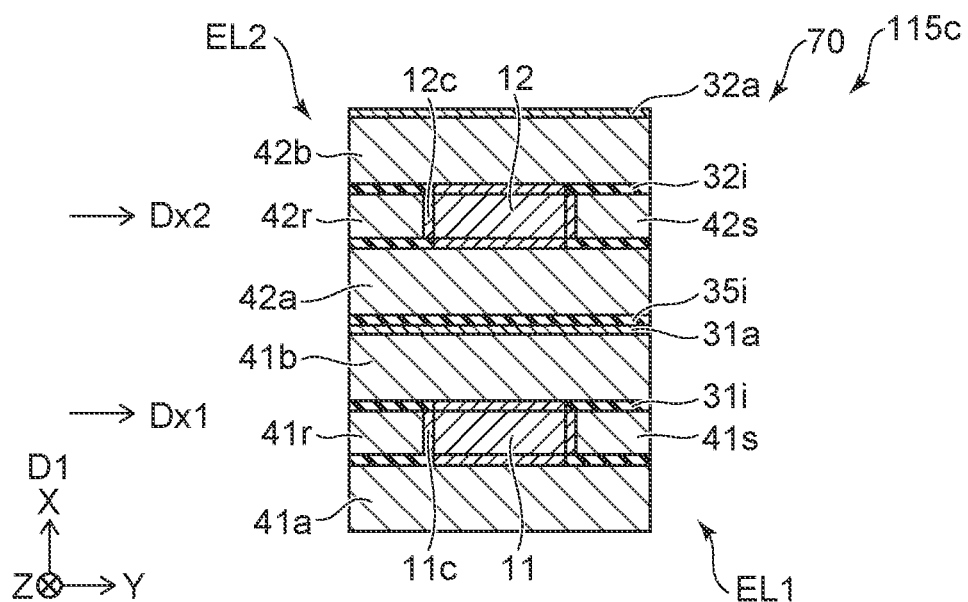
FIG. 18 is a schematic cross-sectional view illustrating a magnetic head according to the first embodiment.

FIG. 18 is a schematic cross-sectional view illustrating a magnetic head according to the first embodiment.

As shown in FIG. 18, in the magnetic head 115c, the first element EL1 further includes the first magnetic layer 31a. The first magnetic layer 31a is provided between the first opposing shield 41b and the second shield 42a. The second element EL2 may further include the second magnetic layer 32a. The second opposing shield 42b is provided between the second magnetic member 12 and the second magnetic layer 32a. Also, in the example of the magnetic head 115c, these magnetic layers stabilize the magnetic field of the shield.

Figure 19:
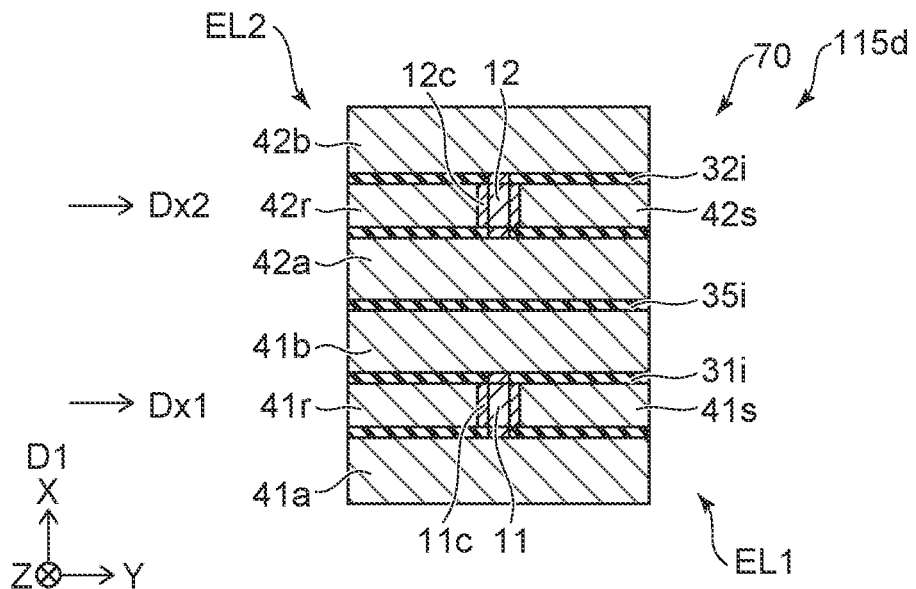
FIG. 19 is a schematic cross-sectional view illustrating a magnetic head according to the first embodiment.

FIG. 19 is a schematic cross-sectional view illustrating a magnetic head according to the first embodiment.

As shown in FIG. 19, in a magnetic head 115d, the length of the first magnetic member 11 in the first crossing direction Dx1 may be equal to or less than the length of the first magnetic member 11 in the first direction D1. The length of the second magnetic member 12 in the second crossing direction Dx2 may be equal to or less than the length of the second magnetic member 12 in the first direction D1.

The configurations of the magnetic heads 115, 115a to 115d may be applied to the various magnetic heads and magnetic recording devices described above.

Second Embodiment

The second embodiment relates to a magnetic recording device.

The magnetic recording device according to the embodiment includes the magnetic head according to the first embodiment and a control circuit 50C. As shown in FIGS. 1 to 14, the magnetic recording devices 120, 120a, 121~124, 121a to 121c, 122a to 122c, 123a, and 124a include magnetic heads 110, 110a, 111~114, 111a to 111c, 112a to 112c, 113a, and 114a, respectively.

For example, in the magnetic recording device 120, the first current circuit 51a is configured to supply the first current between the first side shield terminal 21s and the common side shield terminal 20T. The second current circuit 52a is configured to supply the second current between the second side shield terminal 22s and the common side shield terminal 20T.

For example, in the magnetic recording device 120, the first current circuit 51a is configured to supply the first current between the first side shield terminal 21s and the common side shield terminal 20T. The second current circuit 52a is configured to supply the second current between the second side shield terminal 22s and the common side shield terminal 20T.

For example, in the example of the magnetic recording device 121, the first current circuit 51a is configured to supply the first current between the first side shield terminal 21s and the second side shield terminal 22s. In one example, the first current flows from the first side shield 41s to the first opposing side shield 41r, and from the second side shield 42s to the second opposing side shield 42r. In another example, the first current may flow from the first side shield 41s to the first opposing side shield 41r, and may flow from the second opposing side shield 42r to the second side shield 42s.

For example, in the example of the magnetic recording device 122, the first current circuit 51a is configured to supply the first current between the first side shield terminal 21s and the second side shield terminal 22s. In one example, the first current flows from the first side shield 41s to the first opposing side shield 41r, and from the second side shield 42s to the second opposing side shield 42r. In another example, the first current may flow from the first side shield 41s to the first opposing side shield 41r, and may flow from the second opposing side shield 42r to the second side shield 42s.

For example, in the magnetic recording device 123, the control circuit 50C includes the first detection circuit 51v, the second detection circuit 52v, and the first current circuit 51a. The first detection circuit 51v is configured to detect the first electrical signal between the first side shield terminal 21s and the first opposing side shield terminal 21r. The second detection circuit 52v is configured to detect the second electrical signal between the second side shield terminal 22s and the second opposing side shield terminal 22r. The first current circuit 51a is configured to supply the first current between the first shield terminal 21a and the second shield terminal 22a.

For example, in the example of the magnetic recording device 124, the control circuit 50C includes the first detection circuit 51v, the second detection circuit 52v, and the first current circuit 51a. The first detection circuit 51v is configured to detect the first electrical signal between the first side shield terminal 21s and the first opposing side shield terminal 21r. The second detection circuit 52v is configured to detect the second electrical signal between the second side shield terminal 22s and the second opposing side shield terminal 22r. The first current circuit 51a is configured to supply the first current between the first shield terminal 21a and the second shield terminal 22a. In one example, the first current flows from the first shield 41a to the first opposing shield 41b, and from the second opposing shield 42b to the second shield 42a. In another example, the direction of the current may be reversed in the plurality of elements.

Third Embodiment

Figure 20:
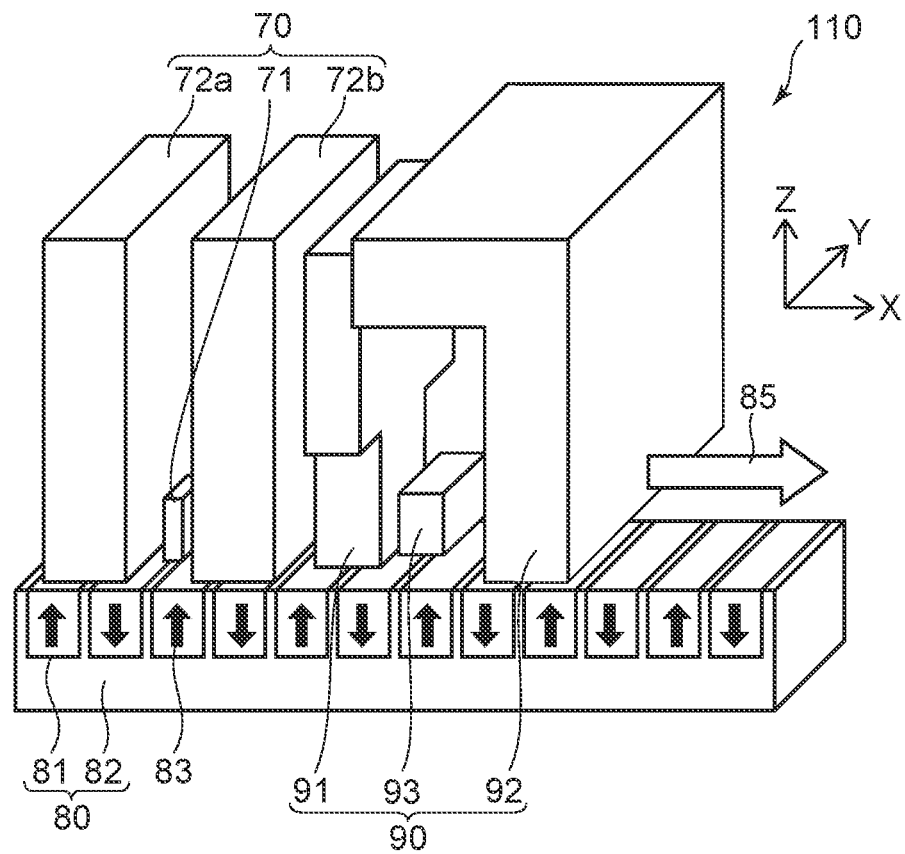
FIG. 20 is a schematic perspective view illustrating the magnetic head and the magnetic recording device according to a third embodiment.

FIG. 20 is a schematic perspective view illustrating the magnetic head and the magnetic recording device according to a third embodiment.

As shown in FIG. 20, the magnetic head 110 according to the embodiment includes the reproducing section 70. The reproducing section 70 includes the magnetic sensor according to the first embodiment. The magnetic head 110 is used together with the magnetic recording medium 80. In this example, magnetic head 110 includes recording section 90. Information is recorded on the magnetic recording medium 80 by the recording section 90 of the magnetic head 110. The reproducing section 70 reproduces information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording section 90. The recording section 90 includes, for example, a first magnetic pole 91 and a second magnetic pole 92. The first magnetic pole 91 is, for example, a main magnetic pole. The second magnetic pole 92 is, for example, a trailing shield. The recording section 90 may include a recording section element 93. The recording section element 93 may include a magnetic field control element, a high frequency oscillation element, or the like. The recording section element 93 may be omitted.

The reproducing section 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is configured to output a signal according to the magnetization 83 of the magnetic recording layer 81.

The first reproducing magnetic shield 72a corresponds to, for example, the first shield 41a (see FIG. 1). The second reproducing magnetic shield 72b corresponds to, for example, the second opposing shield 42b (see FIG. 1). The magnetic reproducing element 71 includes the first magnetic member 11, the second magnetic member 12, and the like.

As shown in FIG. 20, the magnetic recording medium 80 moves relative to the magnetic head 110 in a medium movement direction 85. The magnetic head 110 controls information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 21:
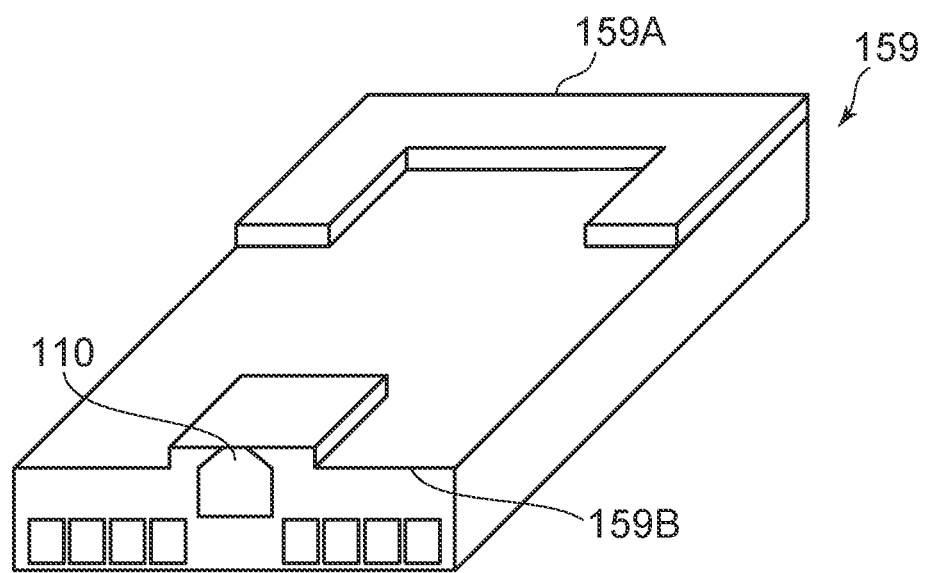
FIG. 21 is a schematic perspective view illustrating a part of the magnetic recording device according to the embodiment.

FIG. 21 is a schematic perspective view illustrating a part of the magnetic recording device according to the embodiment.

FIG. 21 illustrates a head slider.

The magnetic head 110 is provided on the head slider 159. The head slider 159 includes, for example, $Al_2O_3$/TIC or the like. The head slider 159 moves relative to the magnetic recording medium while floating or in contact with the magnetic recording medium.

The head slider 159 includes, for example, an air inflow side 159A and an air outflow side 159B. The magnetic head 110 is arranged on the side surface of the air outflow side 159B of the head slider 159 or the like. As a result, the magnetic head 110 moves relative to the magnetic recording medium while flying above or in contact with the magnetic recording medium.

Figure 22:
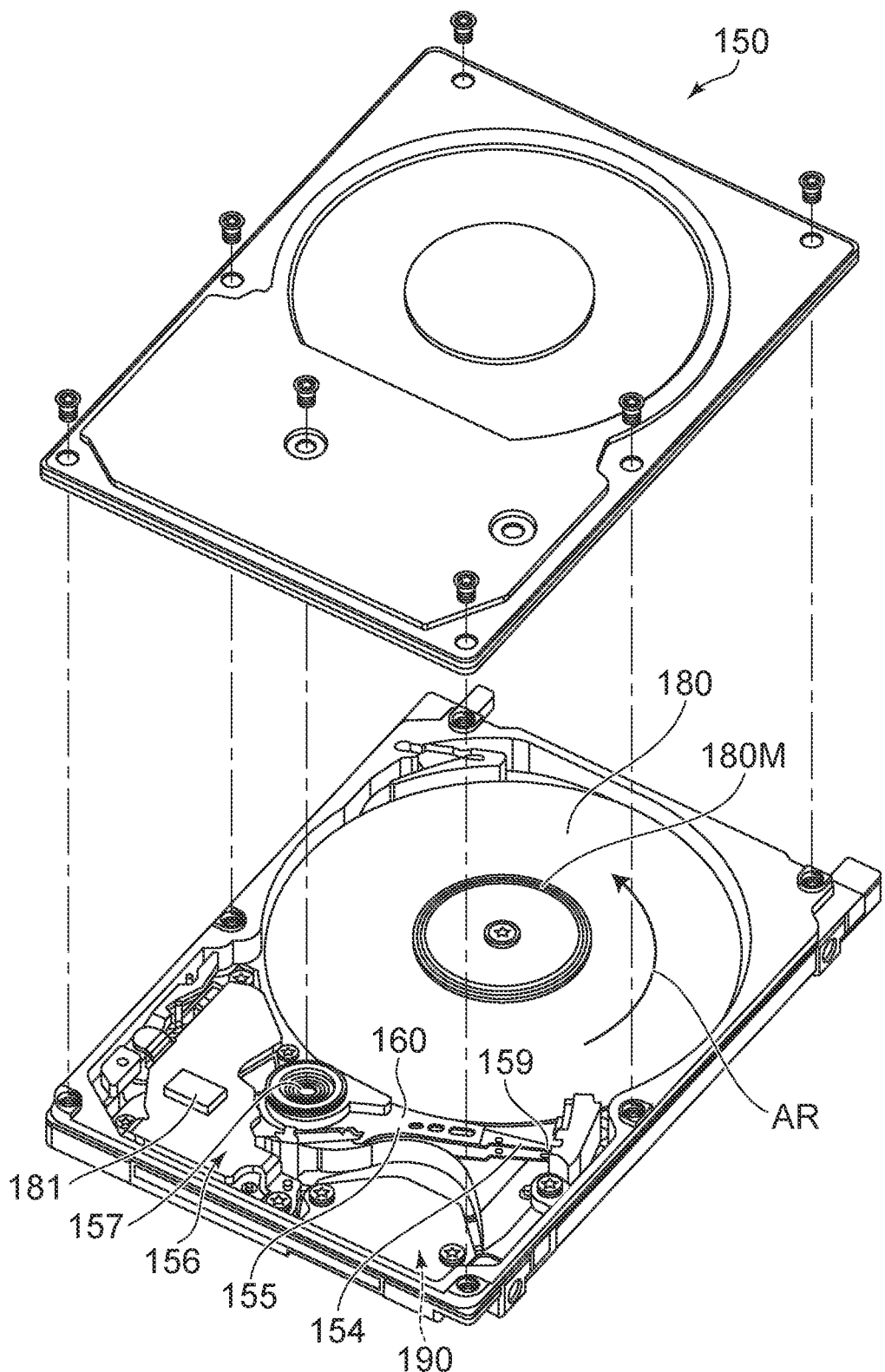
FIG. 22 is a schematic perspective view illustrating the magnetic recording device according to the embodiment.

FIG. 22 is a schematic perspective view illustrating the magnetic recording device according to the embodiment.

Figure 23A:
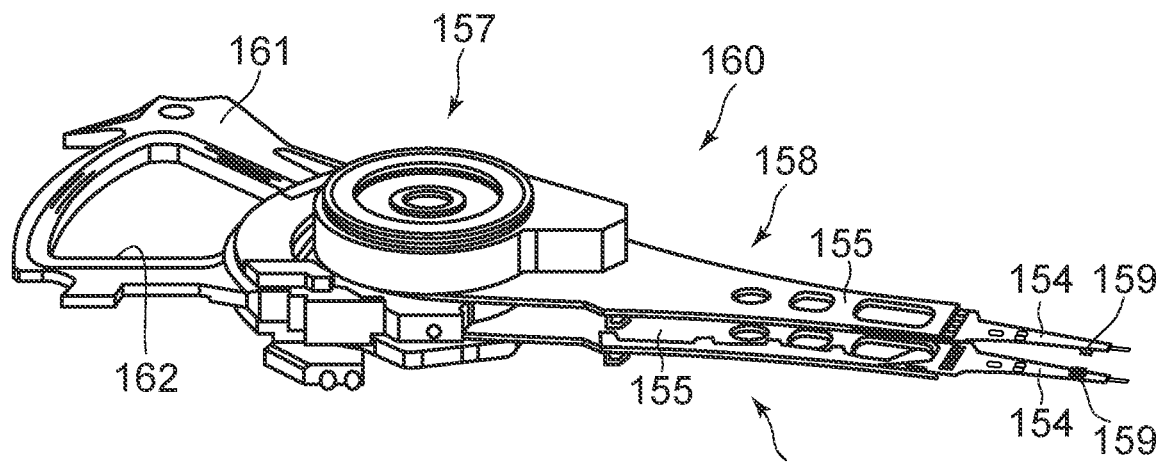
FIGS. 23A and 23B are schematic perspective views illustrating a part of the magnetic recording device according to the embodiment.
Figure 23B:
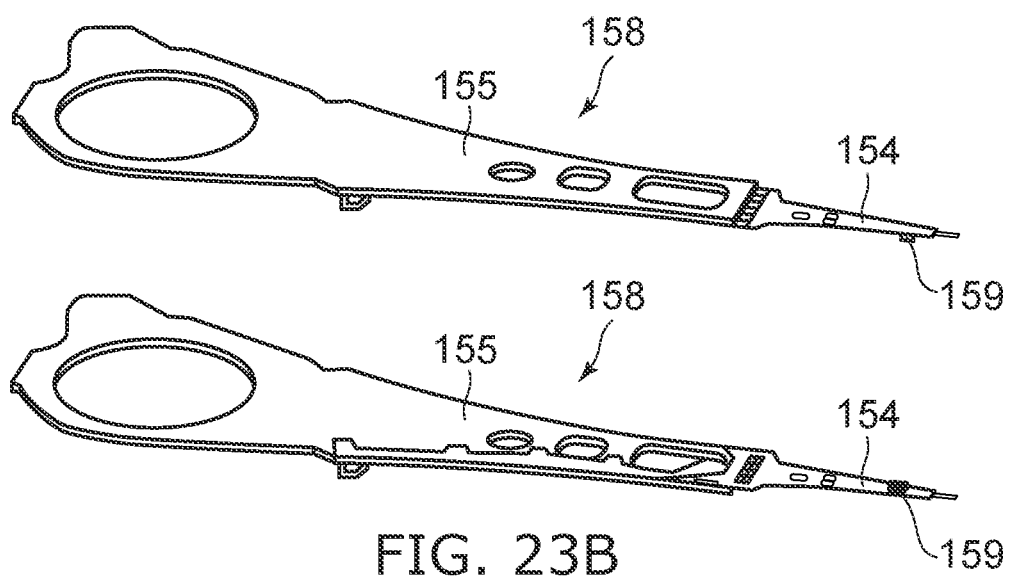

FIGS. 23A and 23B are schematic perspective views illustrating a part of the magnetic recording device according to the embodiment.

The magnetic recording device may be a magnetic recording/reproducing device. As shown in FIG. 22, in a magnetic recording device 150 according to the embodiment, a rotary actuator is used. The recording medium disk 180 is connected to a spindle motor 180M. The recording medium disk 180 is rotated in a direction of arrow AR by the spindle motor 180M. The spindle motor 180M is responsive to control signals from the drive device controller. The magnetic recording device 150 according to the embodiment may include the multiple recording medium disks 180. The magnetic recording device 150 may include a recording medium 181. The recording medium 181 is, for example, an SSD (Solid State Drive). A non-volatile memory such as a flash memory is used for the recording medium 181, for example. For example, the magnetic recording device 150 may be a hybrid HDD (Hard Disk Drive).

The head slider 159 records and reproduces information to be recorded on the recording medium disk 180. The head slider 159 is provided at an end of a thin-film suspension 154. A magnetic head according to the embodiment is provided near the end of the head slider 159.

While the recording medium disk 180 is rotating, the pressing pressure by the suspension 154 and the floating pressure generated at the medium facing surface (ABS) of the head slider 159 are balanced. The distance between the medium facing surface of the head slider 159 and the surface of the recording medium disk 180 is the predetermined fly height. In the embodiment, the head slider 159 may contact the recording medium disk 180. For example, a contact sliding type may be applied.

The suspension 154 is connected to one end of an arm 155 (e.g., an actuator arm). The arm 155 includes, for example, a bobbin part or the like. The bobbin part holds a drive coil. A voice coil motor 156 is provided at the other end of the arm 155. The voice coil motor 156 is a type of linear motor. The voice coil motor 156 includes, for example, a drive coil and a magnetic circuit. The drive coil is wound on the bobbin part of the arm 155. The magnetic circuit includes permanent magnets and opposing yokes. The drive coil is provided between the permanent magnet and the opposing yoke. The suspension 154 includes one end and the other end. The magnetic head is provided at one end of the suspension 154. The arm 155 is connected to the other end of the suspension 154.

The arm 155 is held by ball bearings. Ball bearings are provided at two locations above and below a bearing part 157. The arm 155 can be rotated and slid by the voice coil motor 156. The magnetic head can move to any position on the recording medium disk 180.

FIG. 23A is an enlarged perspective view of the head stack assembly 160, illustrating the configuration of a part of the magnetic recording device.

FIG. 23B is a perspective view illustrating the magnetic head assembly (head gimbal assembly: HGA) 158 that forms part of the head stack assembly 160.

As shown in FIG. 23A, the head stack assembly 160 includes the bearing part 157, the magnetic head assembly 158 and a support frame 161. The magnetic head assembly 158 extends from the bearing part 157. The support frame 161 extends from the bearing part 157. A direction in which the support frame 161 extends is opposite to a direction in which the magnetic head assembly 158 extends. The support frame 161 supports a coil 162 of the voice coil motor 156.

As shown in FIG. 23B, the magnetic head assembly 158 includes the arm 155 extending from the bearing part 157 and the suspension 154 extending from the arm 155.

The head slider 159 is provided at the end of the suspension 154. The head slider 159 is provided with the magnetic head according to the embodiment.

The magnetic head assembly 158 (head gimbal assembly) according to the embodiment includes the magnetic head according to the embodiment, the head slider 159 provided with the magnetic head, the suspension 154 and the arm 155. The head slider 159 is provided at one end of the suspension 154. The arm 155 is connected to the other end of the suspension 154.

The suspension 154 may include, for example, a wiring (not shown) for recording and reproducing signals. The suspension 154 may include, for example, a heater wiring (not shown) for adjusting the fly height. The suspension 154 may include a wiring (not shown) for, for example, an oscillator element or the like. These wires may be electrically connected to multiple electrodes provided on the magnetic head.

A signal processor 190 is provided in the magnetic recording device 150. The signal processor 190 uses a magnetic head to record and reproduce signals on a magnetic recording medium. Input/output lines of the signal processor 190 are connected to, for example, electrode pads of the magnetic head assembly 158 and electrically connected to the magnetic head.

The magnetic recording device 150 according to the embodiment includes the magnetic recording medium, the magnetic head according to the embodiment, a movable part, a position controller, and a signal processor. The movable part separates the magnetic recording medium from the magnetic head or makes them relatively movable while they are in contact with each other. The position controller aligns the magnetic head with a predetermined recording position on the magnetic recording medium. The signal processor records and reproduces signals on the magnetic recording medium using the magnetic head.

For example, the recording medium disk 180 is used as the above magnetic recording medium. The movable part includes, for example, the head slider 159. The position controller described above includes, for example, the magnetic head assembly 158.

The embodiments may include the following configurations (for example, technical proposals).

Configuration 1

A magnetic head, comprising:
  a first element including
    a first shield,
    a first opposing shield, a direction from the first shield to the first opposing shield being along a first direction,
    a first side shield,
    a first opposing side shield, a first crossing direction from the first opposing side shield to the first side shield crossing the first direction, and
    a first magnetic member provided between the first shield and the first opposing shield and between the first side shield and the first opposing side shield;
  a second element including
    a second shield,
    a second opposing shield, a direction from the second shield to the second opposing shield or a direction from the second opposing shield to the second shield being along the first direction,
    a second side shield,
    a second opposing side shield, a second crossing direction from the second opposing side shield to the second side shield crossing the first direction, and
    a second magnetic member provided between the second shield and the second opposing shield and between the second side shield and the second opposing side shield;
  a first shield terminal electrically connected to the first shield;
  a first opposing shield terminal electrically connected to the first opposing shield;
  a second shield terminal electrically connected to the second shield;
  a second opposing shield terminal electrically connected to the second opposing shield;
  a first side shield terminal electrically connected to the first side shield;
  a second side shield terminal electrically connected to the second side shield; and
  a common side shield terminal electrically connected to the first opposing side shield and the second opposing side shield.

Configuration 2

The magnetic head according to Configuration 1, further comprising:
  a third element including
    a third shield,
    a third opposing shield, a direction from the third shield to the third opposing shield or a direction from the third opposing shield to the third shield being along the first direction,
    a third side shield,
    a third opposing side shield, a third crossing direction from the third opposing side shield to the third side shield crossing the first direction, and
    a third magnetic member provided between the third shield and the third opposing shield and between the third side shield and the third opposing side shield;
  a third shield terminal electrically connected to the third shield;
  a third opposing shield terminal electrically connected to the third opposing shield; and
  a third side shield terminal electrically connected to the third side shield,
the common side shield terminal being further electrically connected to the third opposing side shield.

Configuration 3

A magnetic head, comprising:
  a first element including
    a first shield,
    a first opposing shield, a direction from the first shield to the first opposing shield being along a first direction,
    a first side shield,
    a first opposing side shield, a first crossing direction from the first opposing side shield to the first side shield crossing the first direction, and
    a first magnetic member provided between the first shield and the first opposing shield and between the first side shield and the first opposing side shield;
  a second element including
    a second shield,
    a second opposing shield, a direction from the second shield to the second opposing shield or a direction from the second opposing shield to the second shield being along the first direction,
    a second side shield,
    a second opposing side shield, a second crossing direction from the second opposing side shield to the second side shield crossing the first direction, and
    a second magnetic member provided between the second shield and the second opposing shield and between the second side shield and the second opposing side shield;
  a first shield terminal electrically connected to the first shield;
  a first opposing shield terminal electrically connected to the first opposing shield;
  a second shield terminal electrically connected to the second shield;
  a second opposing shield terminal electrically connected to the second opposing shield;
  a first side shield terminal electrically connected to the first side shield; and
  a second side shield terminal electrically connected to the second side shield, and
the first opposing side shield being electrically connected to the second opposing side shield.

Configuration 4

The magnetic head according to Configuration 3, further comprising:
  a third element including
    a third shield,
    a third opposing shield, a direction from the third shield to the third opposing shield or a direction from the third opposing shield to the third shield being along the first direction,
    a third side shield,
    a third opposing side shield, a third crossing direction from the third opposing side shield to the third side shield crossing the first direction, and
    a third magnetic member provided between the third shield and the third opposing shield and between the third side shield and the third opposing side shield;
  a third shield terminal electrically connected to the third shield;
  a third opposing shield terminal electrically connected to the third opposing shield; and
  a third side shield terminal electrically connected to the third side shield, the first opposing side shield being electrically connected to the third opposing side shield, and
the third side shield being electrically connected to the second opposing side shield.

Configuration 5

A magnetic head, comprising:
a first element including
a first shield,
a first opposing shield, a direction from the first shield to the first opposing shield being along a first direction,
a first side shield,
a first opposing side shield, a first crossing direction from the first opposing side shield to the first side shield crossing the first direction, and
a first magnetic member provided between the first shield and the first opposing shield and between the first side shield and the first opposing side shield;
a second element including
a second shield,
a second opposing shield, a direction from the second shield to the second opposing shield or a direction from the second opposing shield to the second shield being along the first direction,
a second side shield,
a second opposing side shield, a second crossing direction from the second opposing side shield to the second side shield crossing the first direction, and
a second magnetic member provided between the second shield and the second opposing shield and between the second side shield and the second opposing side shield;
a first shield terminal electrically connected to the first shield;
a first opposing shield terminal electrically connected to the first opposing shield;
a second shield terminal electrically connected to the second shield;
a second opposing shield terminal electrically connected to the second opposing shield;
a first side shield terminal electrically connected to the first side shield and the second side shield; and
a second side shield terminal electrically connected to the first opposing side shield and the second opposing side shield.

Configuration 6

The magnetic head according to Configuration 5, further comprising:
a third element including
a third shield,
a third opposing shield, a direction from the third shield to the third opposing shield or a direction from the third opposing shield to the third shield being along the first direction,
a third side shield,
a third opposing side shield, a third crossing direction from the third opposing side shield to the third side shield crossing the first direction, and
a third magnetic member provided between the third shield and the third opposing shield and between the third side shield and the third opposing side shield;
a third shield terminal electrically connected to the third shield;
a third opposing shield terminal electrically connected to the third opposing shield; and
a third side shield terminal electrically connected to the third side shield, the first side shield terminal being further connected to the third side shield, and
the second side shield terminal being further connected to the third opposing side shield.

Configuration 7

A magnetic head, comprising:
a first element including
a first shield,
a first opposing shield, a direction from the first shield to the first opposing shield being along a first direction,
a first side shield,
a first opposing side shield, a first crossing direction from the first opposing side shield to the first side shield crossing the first direction, and
a first magnetic member provided between the first shield and the first opposing shield and between the first side shield and the first opposing side shield;
a second element including
a second shield,
a second opposing shield, a direction from the second shield to the second opposing shield or a direction from the second opposing shield to the second shield being along the first direction,
a second side shield,
a second opposing side shield, a second crossing direction from the second opposing side shield to the second side shield crossing the first direction, and
a second magnetic member provided between the second shield and the second opposing shield and between the second side shield and the second opposing side shield;
a first side shield terminal electrically connected to the first side shield;
a first opposing side shield terminal electrically connected to the first opposing side shield;
a second side shield terminal electrically connected to the second side shield;
a second opposing side shield terminal electrically connected to the second opposing side shield;
a first shield terminal electrically connected to the first shield; and
a second shield terminal electrically connected to one of the second opposing shield and the second shield, and
other one of the second opposing shield and the second shields being electrically connected to the first opposing shield.

Configuration 8

A magnetic head, comprising:
a first element including
a first shield,
a first opposing shield, a direction from the first shield to the first opposing shield being along a first direction,
a first side shield,
a first opposing side shield, a first crossing direction from the first opposing side shield to the first side shield crossing the first direction, and
a first magnetic member provided between the first shield and the first opposing shield and between the first side shield and the first opposing side shield;
a second element including
a second shield,
a second opposing shield, a direction from the second shield to the second opposing shield or a direction from the second opposing shield to the second shield being along the first direction, a second side shield,
a second opposing side shield, a second crossing direction from the second opposing side shield to the second side shield crossing the first direction, and
a second magnetic member provided between the second shield and the second opposing shield and between the second side shield and the second opposing side shield;
a first side shield terminal electrically connected to the first side shield;
a first opposing side shield terminal electrically connected to the first opposing side shield;
a second side shield terminal electrically connected to the second side shield;
a second opposing side shield terminal electrically connected to the second opposing side shield;
a first shield terminal electrically connected to the first shield; and
a second shield terminal electrically connected to the first opposing shield,
the first shield terminal being further electrically connected to one of the second shield and the second opposing shield, and
the second shield terminal being further electrically connected to other of the second shield and the second opposing shield.

Configuration 9
The magnetic head according to any one of Configurations 1-8, wherein
the first magnetic member includes at least one selected from the group consisting of CoMnGa, CoMnAl, and FePt.

Configuration 10
The magnetic head according to any one of Configurations 1-9, wherein
the first element further includes a first magnetic layer,
the first magnetic layer includes at least one selected from the group consisting of IrMn, PtMn, FeMn, and NiMn, and
the first magnetic layer is provided between the first side shield and the first opposing shield.

Configuration 11
The magnetic head according to any one of Configurations 1-9, wherein
the first element further includes a first magnetic layer,
the first magnetic layer includes at least one selected from the group consisting of IrMn, PtMn, FeMn, and NiMn, and
the first magnetic layer is provided between the first opposing shield and the second shield.

Configuration 12
A magnetic recording device, comprising:
the magnetic head according to Configuration 1; and
a control circuit, and
the control circuit including
a first detection circuit configured to detect a first electrical signal between the first shield terminal and the first opposing shield terminal,
a second detection circuit configured to detect a second electrical signal between the second shield terminal and the second opposing shield terminal,
a first current circuit configured to supply a first current between the first side shield terminal and the common side shield terminal, and
a second current circuit configured to supply a second current between the second side shield terminal and the common side shield terminal.

Configuration 13
A magnetic recording device, comprising:
the magnetic head according to Configuration 3; and
a control circuit, and
the control circuit including
a first detection circuit configured to detect a first electrical signal between the first shield terminal and the first opposing shield terminal;
a second detection circuit configured to detect a second electrical signal between the second shield terminal and the second opposing shield terminal; and
a first current circuit configured to supply a first current between the first side shield terminal and the second side shield terminal.

Configuration 14
The magnetic recording device according to Configuration 13, wherein
the first current flows in a direction from the first side shield to the first opposing side shield, and
the first current flows in a direction from the second side shield to the second opposing side shield.

Configuration 15
A magnetic recording device, comprising:
the magnetic head according to Configuration 5; and
a control circuit, and
the control circuit including
a first detection circuit configured to detect a first electrical signal between the first shield terminal and the first opposing shield terminal,
a second detection circuit configured to detect a second electrical signal between the second shield terminal and the second opposing shield terminal, and
a first current circuit configured to supply a first current between the first side shield terminal and the second side shield terminal.

Configuration 16
The magnetic recording device according to Configuration 15, wherein
the first current flows in a direction from the first side shield to the first opposing side shield, and
the first current flows in a direction from the second side shield to the second opposing side shield.

Configuration 17
A magnetic recording device, comprising:
the magnetic head according to Configuration 7; and
a control circuit, and
the control circuit including
a first detection circuit configured to detect a first electrical signal between the first side shield terminal and the first opposing side shield terminal,
a second detection circuit configured to detect a second electrical signal between the second side shield terminal and the second opposing side shield terminal, and
a first current circuit configured to supply a first current between the first shield terminal and the second shield terminal.

Configuration 18
The magnetic recording device according to Configuration 17, wherein
the first current flows in a direction from the first shield to the first opposing shield, and
the first current flows in a direction from the second shield to the second opposing shield.

Configuration 19
  A magnetic recording device, comprising:
  the magnetic head according to Configuration 8; and
  a control circuit, and
  the control circuit including
    a first detection circuit configured to detect a first electrical signal between the first side shield terminal and the first opposing side shield terminal,
    a second detection circuit configured to detect a second electrical signal between the second side shield terminal and the second opposing side shield terminal, and
    a first current circuit configured to supply a first current between the first shield terminal and the second shield terminal.
Configuration 20
  The magnetic recording device according to Configuration 17, wherein
    the first current flows in a direction from the first shield to the first opposing shield, and
    the first current flows in a direction from the second opposing shield to the second shield.
  According to the embodiment, a magnetic head and a magnetic recording device that can improve performance can be provided.
  In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.
  Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads and magnetic recording devices such as shields, magnetic members, magnetic layers, conductive members, insulating members, terminals, etc., from known art. Such practice is included in the scope of the invention to the extent that similar effects thereto are obtained.
  Further, any two or more components of the specific examples may be combined within the extent of technical feasibility and are included in the scope of the invention to the extent that the purport of the invention is included.
  Moreover, all magnetic heads and magnetic recording devices practicable by an appropriate design modification by one skilled in the art based on the magnetic heads and the magnetic recording devices described above as embodiments of the invention also are within the scope of the invention to the extent that the purport of the invention is included.
  Various other variations and modifications can be conceived by those skilled in the art within the spirit of the invention, and it is understood that such variations and modifications are also encompassed within the scope of the invention.
  While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
   a first element including
     a first shield,
     a first opposing shield, a direction from the first shield to the first opposing shield being along a first direction,
     a first side shield,
     a first opposing side shield, a first crossing direction from the first opposing side shield to the first side shield crossing the first direction, and
     a first magnetic member provided between the first shield and the first opposing shield and between the first side shield and the first opposing side shield;
   a second element including
     a second shield,
     a second opposing shield, a direction from the second shield to the second opposing shield or a direction from the second opposing shield to the second shield being along the first direction,
     a second side shield,
     a second opposing side shield, a second crossing direction from the second opposing side shield to the second side shield crossing the first direction, and
     a second magnetic member provided between the second shield and the second opposing shield and between the second side shield and the second opposing side shield;
   a first side shield terminal electrically connected to the first side shield;
   a first opposing side shield terminal electrically connected to the first opposing side shield;
   a second side shield terminal electrically connected to the second side shield;
   a second opposing side shield terminal electrically connected to the second opposing side shield;
   a first shield terminal electrically connected to the first shield; and
   a second shield terminal electrically connected to one of the second opposing shield and the second shield, and
   the other one of the second opposing shield and the second shields being electrically connected to the first opposing shield.

2. The magnetic head according to claim 1, wherein
   the first magnetic member includes at least one selected from the group consisting of CoMnGa, CoMnAl, and FePt.

3. The magnetic head according to claim 1, wherein
   the first element further includes a first magnetic layer,
   the first magnetic layer includes at least one selected from the group consisting of IrMn, PtMn, FeMn, and NiMn, and
   the first magnetic layer is provided between the first opposing shield and the second shield.

4. A magnetic recording device, comprising:
   the magnetic head according to claim 1; and
   a control circuit, and
   the control circuit including
     a first detection circuit configured to detect a first electrical signal between the first side shield terminal and the first opposing side shield terminal, a second detection circuit configured to detect a second electrical signal between the second side shield terminal and the second opposing side shield terminal, and a first current circuit configured to supply a first current between the first shield terminal and the second shield terminal.

5. The magnetic recording device according to claim 4, wherein the first current flows in a direction from the first shield to the first opposing shield, and the first current flows in a direction from the second shield to the second opposing shield.

6. The magnetic recording device according to claim 4, wherein the first current flows in a direction from the first shield to the first opposing shield, and the first current flows in a direction from the second opposing shield to the second shield.

* * * * *